United States Patent
Suzuki

(10) Patent No.: US 9,712,068 B2
(45) Date of Patent: Jul. 18, 2017

(54) POWER SUPPLY DEVICE, ADAPTER, POWER RECEIVING DEVICE, AND POWER SUPPLY METHOD

(71) Applicant: SONY CORPORATION, Tokyo (JP)

(72) Inventor: Takahiro Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 732 days.

(21) Appl. No.: 13/863,564

(22) Filed: Apr. 16, 2013

(65) Prior Publication Data
US 2013/0314069 A1 Nov. 28, 2013

(30) Foreign Application Priority Data

May 24, 2012 (JP) .................................. 2012-118107
Aug. 9, 2012 (JP) .................................. 2012-177234

(51) Int. Cl.
| | |
|---|---|
| *G05B 11/01* | (2006.01) |
| *H02M 5/02* | (2006.01) |
| *H02J 5/00* | (2016.01) |
| *H01R 13/66* | (2006.01) |
| *H01R 24/76* | (2011.01) |

(52) U.S. Cl.
CPC .............. *H02M 5/02* (2013.01); *H02J 5/005* (2013.01); *H01R 13/6691* (2013.01); *H01R 24/76* (2013.01)

(58) Field of Classification Search
None
See application file for complete search history.

(56) References Cited

U.S. PATENT DOCUMENTS

| | | | | |
|---|---|---|---|---|
| 4,915,639 | A * | 4/1990 | Cohn ................. | G06K 7/10861 307/116 |
| 5,777,397 | A * | 7/1998 | Lam ........................ | G06F 1/189 307/28 |
| 5,910,776 | A * | 6/1999 | Black ...................... | G01S 13/74 307/140 |
| 6,175,165 | B1 * | 1/2001 | Lam ........................ | G06F 1/266 307/28 |
| 6,328,584 | B1 * | 12/2001 | Follett ................... | H01R 27/00 439/222 |

(Continued)

FOREIGN PATENT DOCUMENTS

JP 2008-047410 2/2008

*Primary Examiner* — Curtis King
(74) *Attorney, Agent, or Firm* — Paratus Law Group, PLLC

(57) ABSTRACT

There is provided a power supply device, including a connection state determiner that determines a connection state between an external power recipient device and a power line on which electric power is transmitted, a communication control unit that, in a case where the connection state determiner determines that the external power recipient device is connected to the power line, causes information related to power receiving capability corresponding to the external power recipient device to be acquired by wireless communication, a power receiving capability specifier that specifies the power receiving capability of the external power recipient device on the basis of the acquired information related to the power receiving capability, and a power control unit that causes electric power compatible with the external power recipient device to be transmitted on the basis of the specified power receiving capability.

13 Claims, 16 Drawing Sheets

(56) References Cited

U.S. PATENT DOCUMENTS

| | | | | |
|---|---|---|---|---|
| 8,471,415 B1* | 6/2013 | Heninwolf | ......... | H01R 13/6683 307/125 |
| 2005/0195090 A1* | 9/2005 | Finan | ....................... | H02J 9/06 340/656 |
| 2006/0214510 A1* | 9/2006 | Patel | .................. | H01R 13/6675 307/12 |
| 2007/0149013 A1* | 6/2007 | Eastham | ............ | H01R 13/7036 439/140 |
| 2011/0291813 A1* | 12/2011 | Jansma | ................... | G06F 1/266 340/10.5 |
| 2012/0306661 A1* | 12/2012 | Xue | ..................... | G05B 19/042 340/870.02 |
| 2013/0210249 A1* | 8/2013 | Takemura | ............... | H04B 3/54 439/170 |
| 2014/0159864 A1* | 6/2014 | Allen | ..................... | G08C 17/02 340/5.61 |
| 2014/0239881 A1* | 8/2014 | Cassidy | ............... | H02J 7/0042 320/107 |
| 2016/0129801 A1* | 5/2016 | Gale | ..................... | B60L 3/0046 320/162 |

* cited by examiner

FIG. 5
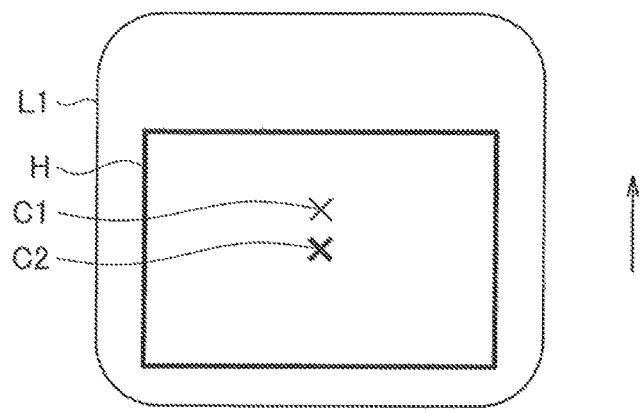
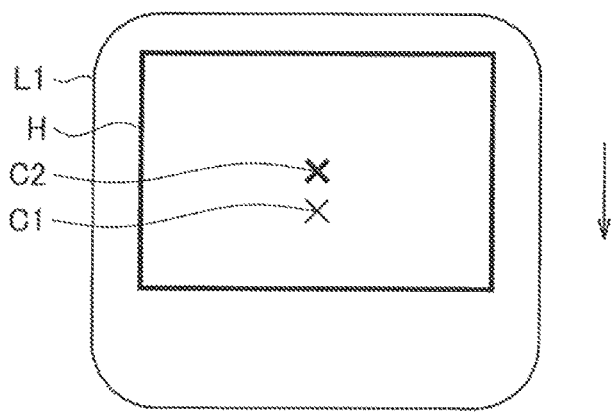
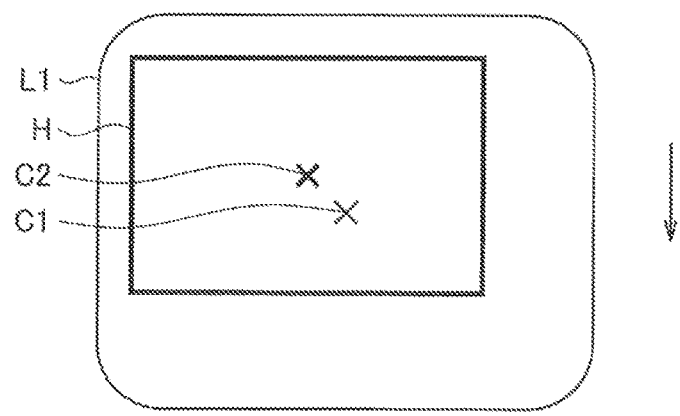

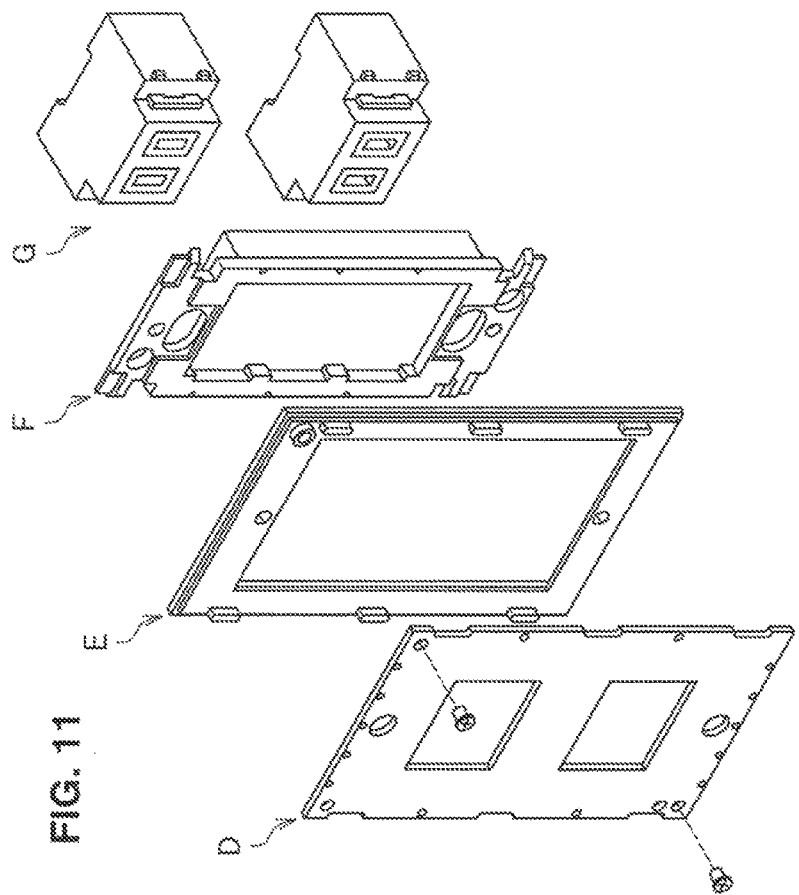
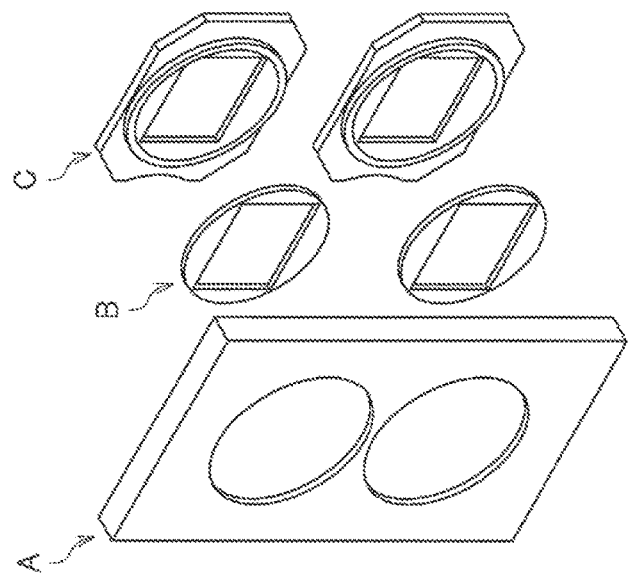
FIG. 11

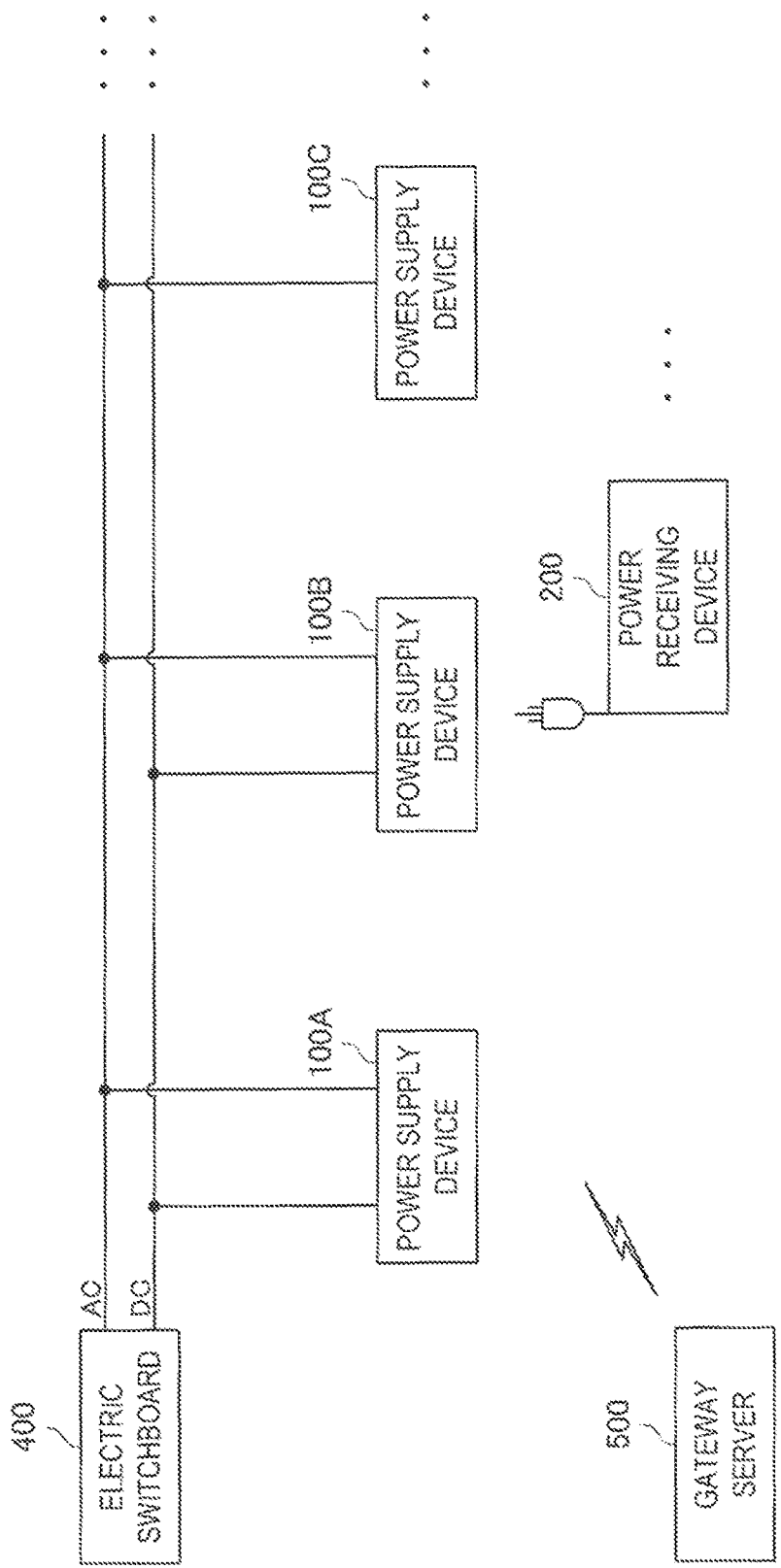

POWER SUPPLY DEVICE, ADAPTER, POWER RECEIVING DEVICE, AND POWER SUPPLY METHOD

BACKGROUND

The present disclosure relates to a power supply device, adapter, power receiving device, and power supply method.

The power receiving capability of a device (hereinafter referred to as a "power receiving device") that operates by receiving electric power is not constant in all power receiving devices and usually differs according to the power receiving device (for example, the type of power receiving device, the manufacturer, or the model). For this reason, when electric power exceeding the power receiving capability of the power receiving device is supplied to the power receiving device, for example, an undesired situation in which the power receiving device is damaged may occur.

In this regard, techniques of controlling transmission of electric power to a power receiving device have been developed. For example, a technique discussed in JP 2008-047410A has been proposed as a technique of invoking a state in which electric power can be transmitted to a power receiving device when a voltage of supplied electric power matches a previously set voltage.

SUMMARY

For example, in the technique discussed in JP 2008-047410A, when a voltage of supplied electric power matches a previously set voltage, a state in which electric power can be transmitted to a power receiving device is invoked. Thus, for example, when the technique discussed in JP 2008-047410A is used, it is possible to prevent electric power exceeding the power receiving capability of the power receiving device from being supplied to the power receiving device.

However, when the technique discussed in JP 2008-047410A is used, for example, electric power is not transmitted when a voltage of supplied electric power does not match a previously set voltage. Thus, for example, when the technique discussed in JP 2008-047410A is used, for example, although a power receiving device is connected to a device (a transmission side device; hereinafter referred to as a "power supply device") that supplies electric power such as an electrical outlet, electric power may not be transmitted, and thus the convenience of a user who desires transmission of electric power to a power receiving device is likely to be reduced.

The present disclosure proposes a new and improved power supply device, adapter, power receiving device, and power supply method able to cause a recipient external device to receive power compatible with the recipient external device.

According to an embodiment of the present disclosure, there is provided a power supply device, including a connection state determiner that determines a connection state between an external power recipient device and a power line on which electric power is transmitted, a communication control unit that, in a case where the connection state determiner determines that the external power recipient device is connected to the power line, causes information related to power receiving capability corresponding to the external power recipient device to be acquired by wireless communication, a power receiving capability specifier that specifies the power receiving capability of the external power recipient device on the basis of the acquired information related to the power receiving capability, and a power control unit that causes electric power compatible with the external power recipient device to be transmitted on the basis of the specified power receiving capability.

Further, according to an embodiment of the present disclosure, there is provided an adapter, including a connecting unit that connects to a power line on which electric power is transmitted, an output unit that outputs the electric power transmitted from the power line, and a wireless communication unit that wirelessly communicates with a power supply device that transmits electric power, and transmits information related to power receiving capability.

Further, according to an embodiment of the present disclosure, there is provided a power receiving device, including a connecting unit that connects to a power line on which electric power is transmitted, a storage unit that stores information related to power receiving capability, a wireless communication unit that wirelessly communicates with a power supply device that transmits electric power, and transmits the information related to the power receiving capability, and an operating unit that operates on the electric power transmitted from the power line.

Further, according to an embodiment of the present disclosure, there is provided a power supply method, including determining a connection state between an external power recipient device and a power line on which electric power is transmitted, causing, in a case of determining that the external power recipient device is connected to the power line, information related to power receiving capability corresponding to the external power recipient device to be acquired by wireless communication, specifying the power receiving capability of the external power recipient device on the basis of the acquired information related to the power receiving capability, and causing electric power compatible with the external power recipient device to be transmitted on the basis of the specified power receiving capability.

According to the embodiments of the present disclosure described above, it is possible to cause an external power recipient device to receive power compatible with the external power recipient device.

BRIEF DESCRIPTION OF THE DRAWINGS

FIG. 5 is an explanatory diagram illustrating other exemplary layouts of a high-frequency transmitting unit that fulfills the role of a communication antenna in a power supply device according to the present embodiment;

FIG. 11 is an explanatory diagram illustrating an exemplary structure of a power supply device according to the present embodiment for realizing the visual notification illustrated in FIG. 10;

FIG. 16 is an explanatory diagram illustrating an example of a power system having a power supply device according to the present embodiment.

DETAILED DESCRIPTION OF THE EMBODIMENT(S)

Figure 1:
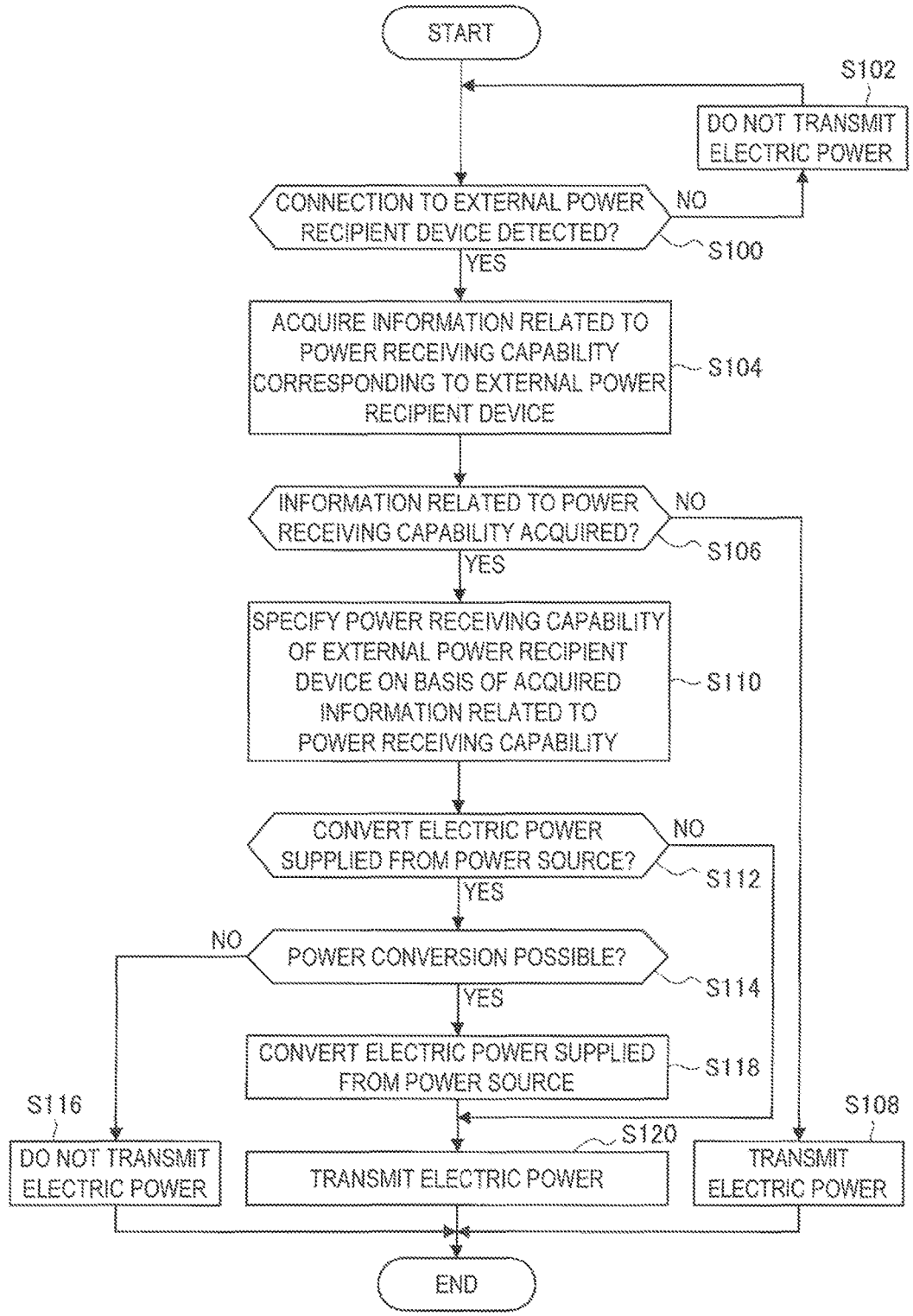
FIG. 1 is a flowchart illustrating an example of a process in accordance with a power supply method in a power supply device according to the present embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description hereinafter will proceed in the following order.

1. Power supply method according to the present embodiment
2. Wireless communication according to the present embodiment
3. Power supply device according to the present embodiment
4. Power receiving device according to the present embodiment
5. Adapter according to the present embodiment
6. Program according to the present embodiment (Power Supply Method According to the Present Embodiment)

Before describing the configuration of a power supply device, power receiving device, and adapter according to the present embodiment, a power supply method according to the present embodiment will be described first. Hereinafter, a power supply method according to the present embodiment will be described, taking as an example the case where a power supply device according to the present embodiment conducts processes in accordance with a power supply method according to the present embodiment.

Furthermore, although a power supply method according to the present embodiment will be hereinafter described by primarily taking as an example the case where a power source according to the present embodiment is an alternating current (AC) power source such as an electric utility, for example, a power source according to the present embodiment is not limited to an AC power source. For example, a power source according to the present embodiment may also be a battery or a direct current (DC) power source supplied from a power-generating system such as a solar panel. In addition, although a power supply device according to the present embodiment causes electric power, which is based on a power source supplied via an electric switchboard installed in a building, for example, to be transmitted to an external power recipient device, the electric power that a power supply device according to the present embodiment causes to be transmitted is not limited to electric power based on a power source supplied via an electric switchboard or the like. For example, a power supply device according to the present embodiment may also cause electric power based on an internal power source, such as a battery provided in a power supply device according to the present embodiment, to be transmitted to the external power recipient device.

As discussed above, there is a risk of hampering user convenience in some cases, such as when electric power is not transmitted even though a power supply device is connected to a power receiving device, for example.

Thus, a power supply device according to the present embodiment determines the connection state between the external power recipient device and a power line on which electric power is transmitted (the connection state determining process). Also, in the case of determining that the external power recipient device is connected to the power line, a power supply device according to the present embodiment causes information related to the power receiving capability corresponding to the external power recipient device to be acquired by wireless communication (the communication control process). Additionally, a power supply device according to the present embodiment specifies the power receiving capability of the external power recipient device on the basis of the acquired information related to power receiving capability (the power receiving capability specifying process). A power supply device according to the present embodiment then causes power compatible with the external power recipient device to be transmitted on the basis of the specified power receiving capability (the power control process).

Although a power receiving device such as a power receiving device according to the present embodiment is cited herein as an example of an external power recipient device according to the present embodiment, an external power recipient device according to the present embodiment is not limited to a power receiving device according to the present embodiment. For example, an external power recipient device according to the present embodiment may also be an adapter according to the present embodiment. Hereinafter, processes in accordance with a power supply method according to the present embodiment will be described, primarily taking as an example the case where an external power recipient device according to the present embodiment is a power receiving device according to the present embodiment.

Also, information related to power receiving capability according to the present embodiment refers to data enabling the direct or indirect specification of the power receiving capability of an external device, for example. Potential examples of information related to power receiving capability according to the present embodiment include power receiving capability information indicating the power receiving capability of an external device, and identification information indicating an external device.

Power receiving capability according to the present embodiment refers to information (data) indicating the power that the external device is able to receive, or in other words the power supported by the external device, for example. A potential example of power receiving capability information according to the present embodiment is data that directly indicates the power supported by an external device, as indicated by (A) to (C) below.

(A) Data indicating the power type (AC, DC)

(B) Data indicating the frequency (such as 50 Hz, 60 Hz, or otherwise), the voltage (such as 100 V, 200 V, or otherwise), and the maximum current (such as 10 A, 20 A, or otherwise) (in the case where the power type is AC)

(C) Data indicating the voltage (such as 5 V, 12 V, 19 V, or otherwise) and the maximum current (such as 1 A, 5 A, or otherwise) (in the case where the power type is DC)

Note that power receiving capability information according to the present embodiment is not limited to data that directly indicates the power supported by an external device, as indicated by (A) to (C) above. For example, power receiving capability information according to the present embodiment may also include data that indirectly or supplementarily indicates the power supported by an external device, as indicated by (D) to (F) below, for example.

(D) Data indicating the type and polarity of the DC jack of a DC power source (such as "EIAJ #1 (outer electrode −, inner electrode +)", "EIAJ #1 (outer electrode +, inner electrode −)", "EIAJ #2 (outer electrode −, inner electrode +)", "EIAJ #2 (outer electrode +, inner electrode −)", or "A Corp. PC 15 V (outer electrode −, inner electrode +)")

(E) Data indicating the power source type (such as series regulator type, switching type, or transrectification type)

(F) Data indicating the noise level (such as "Class S (100 mV or less)", "Class A (500 mV or less)", or "Class C (unregulated)")

Data like the above are potential examples of power receiving capability information according to the present embodiment. Note that power receiving capability information according to the present embodiment is not limited to the data indicated above. For example, power receiving capability information according to the present embodiment may also include data indicating a priority order. For example, in the case where priority levels of "100 V (priority 1)" and "125 V (priority 2)" are set in the data indicating compatible voltages, a power supply device according to the present embodiment may cause power at the higher-priority voltage of 100 V to be transmitted in the power control process discussed later.

Power receiving capability information according to the present embodiment may also include data indicating the precision (such as 2% or 0.2%), and data indicating the output power source type (such as flyback), for example. Note that power receiving capability information according to the present embodiment is not limited to the above examples insofar as the power receiving capability information is information (data) enabling the specification of the power that the external power recipient device is able to receive.

In addition, identification information according to the present embodiment refers to information (data) which may be used to identify an external device. Potential identification information according to the present embodiment includes data indicating an identification number unique to the external device, data indicating the type of external device (such as data indicating one or more from among the category (such as data indicating general category distinctions such as television, dryer, refrigerator), serial number, maximum rating, and maximum power draw), and power waveform data indicating power waveforms when the external device is in use (when the external device is in operation), for example. However, identification information according to the present embodiment is not limited to the above examples insofar as the identification information is information (data) which may be used to identify an external device, such as external device registration data (data indicating a registration data and registered user, for example).

Note that information related to power receiving capability according to the present embodiment is not limited to the above power receiving capability information and the above identification information. For example, information related to power receiving capability according to the present embodiment may also include authentication information (data) used for authentication, such as a shared key or encryption key data. By conducting authentication on the basis of authentication information, a power supply device according to the present embodiment is able to cause a specific, correctly authenticated device to receive power, thus making it possible to prevent unauthorized power receiving. Note that is it also possible for a power supply device according to the present embodiment to not conduct authentication in the case of an application that does not request authentication, for example. In additions, algorithms related to authentication (such as for encryption, random number generation, and two-way authentication) may be included in a power supply device according to the present embodiment, and may also be included in a device external to a power supply device according to the present embodiment (such as a server), for example. In the case where algorithms related to authentication are included in a device external to a power supply device according to the present embodiment, the power supply device according to the present embodiment conducts authentication-related processes in conjunction with that external device.

Hereinafter, processes in accordance with a power supply method in a power supply device according to the present embodiment will be described more specifically.

(1) Connection State Determining Process

A power supply device according to the present embodiment determines the connection state between the external power recipient device and a power line.

In the case where, a power supply device according to the present embodiment is equipped with a connecting unit (discussed later) that connects a power line to an external device, for example, at this point the power supply device according to the present embodiment determines the connection state between the power line and the external device at the connecting unit (discussed later). However, the target whose connection state is determined by a power supply device according to the present embodiment is not limited to a connecting unit (discussed later). For example, a power supply device according to the present embodiment may also determine the connection state between a power line and an external device at an external connecting device that connects the power line to the external device (for example, a device having a similar function and configuration as the connecting unit discussed later).

More specifically, a power supply device according to the present embodiment determines the connection state at a connecting unit (discussed later) or the like on the basis of a detection signal, which is transmitted from the connecting unit (discussed later) or the like, and which indicates a change in the connection state of an external device (such as a change from an unconnected state to a connected state or a change from a connected state to an unconnected state, for example). For example, a power supply device according to the present embodiment determines that an external power recipient device is connected to a power line in the case where the transmitted detection signal indicates a change from an unconnected state to a connected state. As another example, a power supply device according to the present embodiment does not determine that an external power recipient device is connected to a power line in the case where a detection signal indicating a change from an unconnected state to a connected state is not transmitted, or in the case where, after a detection signal indicating a change from an unconnected state to a connected state is transmitted, a transmitted detection signal indicates a change from a connected state to an unconnected state.

(2) Communication Control Process

In the case of determining that an external power recipient device is connected to a power line in the above process (1) (the connection state determining process), a power supply device according to the present embodiment causes information related to the power receiving capability corresponding to the external power recipient device to be acquired by wireless communication.

In the case where a power supply device according to the present embodiment is equipped with a wireless communication unit (discussed later) that wirelessly communicates with an external device, for example, the power supply device according to the present embodiment controls wireless communication in the wireless communication unit (discussed later) and causes the wireless communication unit (discussed later) to wirelessly communicate and thereby acquire information related to the power receiving capability corresponding to an external power recipient device. However, the target whose wireless communication is controlled by a power supply device according to the present embodiment is not limited to a wireless communication unit (discussed later). For example, a power supply device according to the present embodiment may control wireless communication in an external wireless communication device that wirelessly communicates with an external device (for example, a device having a similar function and configuration as the wireless communication unit discussed later), and cause the wireless communication device to wirelessly communicate and thereby acquire information related to the power receiving capability corresponding to an external power recipient device. Hereinafter, processes in accordance with a power supply method according to the present embodiment will be described, primarily 26 taking as an example the case where a power supply device according to the present embodiment is equipped with a wireless communication unit (discussed later).

More specifically, a power supply device according to the present embodiment causes the wireless communication unit (discussed later) to transmit a transmission request containing a transmission command causing information related to power receiving capability to be transmitted, for example. Herein, an external power recipient device according to the present embodiment (an external device determined to be connected to a power line) is a potential example of a device to which a transmission request is made to be transmitted. Then, due to the wireless communication unit (discussed later) receiving information related to power receiving capability transmitted in response to the transmission request, a power supply device according to the present embodiment acquires information related to power receiving capability corresponding to the external power recipient device.

Other conceivable methods of acquiring information related to power receiving capability from an external device include a method of acquiring information by communication over power lines such as power line communication (PLC), and a method of acquiring information by serial communication such as Universal Asynchronous Receiver/Transmitter (UART) or Inter-Integrated Circuit ($I^2C$) via a communication line that differs from the power line.

However, since a carrier wave and data communication waveforms are output over the power line in the case of using a method that acquires information by communication over power lines, there is a risk of producing unwanted voltage waveforms not from the power source over the power line. As a result, there is a possibility of causing damage or malfunction in the power receiving device and power oscillation, for example. Additionally, in the case of using a method of acquiring information by serial communication via a communication line that differs from the power line, unwanted voltage is applied to a connected in the case where that device is not compatible with the communication standard. As a result, there is a possibility of causing damage or malfunction in the device. Also, using a method of acquiring information by serial communication via a communication line that differs from the power line involves adding a terminal for serial communication, which is inconvenient to lay out in parallel to the power line and expected to create difficulties related to the physical layout.

Thus, in this embodiment, information related to the power receiving capability corresponding to an external power recipient device is acquired by wireless communication. Wireless communication between a power supply device and an external power recipient device according to the present embodiment will be discussed later.

(3) Power Receiving Capability Specifying Process

A power supply device according to the present embodiment specifies the power receiving capability of an external power recipient device on the basis of information related to power receiving capability that is acquired by the above process (2) (the communication control process). More specifically, a power supply device according to the present embodiment specifies the power receiving capability of an external power recipient device on the basis of power receiving capability information (an example of information related to power receiving capability) or identification information (information related to power receiving capability), for example.

For example, in the case of acquiring power receiving capability information from an external power recipient device, a power supply device according to the present embodiment specifies the power that the external power recipient device is able to receive, or in other words the power receiving capability of the external power recipient device, on the basis of the power receiving capability information.

More specifically, a power supply device according to the present embodiment specifies the power that an external power recipient device is able to receive on the basis of data that directly indicates the power supported by the external device as indicated in the above (A) to (C), for example. By specifying the power that an external power recipient device is able to receive on the basis of data that directly indicates the power supported by the external device as indicated in the above (A) to (C), a power supply device according to the present embodiment is able to cause, in the power control process discussed later, the transmission of power which is compatible with the external power recipient device and which does not exceed the power receiving capability of the external power recipient device. In addition, by using data that indicates the maximum voltage as one example of data that directly indicates the power supported by an external device, a power supply device according to the present embodiment becomes able to apply control in the power control process discussed later such that, if the consumed current of the power being transmitted exceeds the maximum current, a restraint is applied so that no further current flows, or power transmission is suspended, for example.

Furthermore, in the case where the power receiving capability information contains data that indirectly or supplementarily indicates the power supported by an external device as indicated in the above (D) to (F), for example, a power supply device according to the present embodiment may also specify the content expressed by the data that indirectly or supplementarily indicates the power supported by the external device as indicated in the above (D) to (F) as the power receiving capability of the external power recipient device.

By specifying the content expressed by data that indirectly or supplementarily indicates the power supported by the external device as indicated in the above (D) to (F) as the power receiving capability of an external power recipient device, a power supply device according to the present embodiment becomes able to transmit power better suited to the external power recipient device in the power control process discussed later, for example.

An example will now be given in which a power supply device according to the present embodiment specifies the power receiving capability as follows for an external power recipient device A and an external power recipient device B determined to be connected to a power line, on the basis of the content expressed by data indicated in above (E) and (F). Additionally, assume that a power supply unit (discussed later) or other such device that supplies power under control by the power control process discussed later is equipped with a power circuit A and a power circuit B have properties like the following.

External power recipient device A
Power source type: transrectification, power range 8 V to 10 V
Noise level: Class C (unregulated)
External power recipient device B
Power source type: series regulator, power range 5 V±5%
Noise level: Class S (100 mV or less)
Power circuit A
Output precision: power range 6 V, 12 V, or 22 V
Noise level: 600 mV or less
Power circuit B
Output precision: power range 5 V to 24 V in 1 V steps
Noise level: 100 mV or less In the above case, the power receiving capability information indicates that the external power recipient device A guarantees stable performance even if power is not output from a power circuit with excellent power source properties (for example, a power circuit with high output capacity and noise tolerance). Also, in the above case, the power receiving capability information indicates that the external power recipient device B does not yield good performance unless power is output from a power circuit with excellent power source properties, such as an audio product or high-performance, precision equipment, for example.

Furthermore, power circuits with better power source properties generally cost more. For this reason, the power circuit provided in the power supply unit (discussed later) or other such device that supplies power is not limited to being a power circuit with excellent power source properties like a power-supplying device provided with the above power circuit A or power circuit B.

Thus, in the above example, a power supply device according to the present embodiment causes the power transmitted to the external power recipient device B to be output from the power circuit B with better power source properties in the power control process discussed later, for example.

By specifying the content expressed by data that indirectly or supplementarily indicates the power supported by an external device as the power receiving capability of an external power recipient device as above, a power supply device according to the present embodiment becomes able to select a power circuit matching the demands of the external power recipient device. Consequently, by specifying the content expressed by data that indirectly or supplementarily indicates the power supported by an external device as the power receiving capability of the external power recipient device, a power supply device according to the present embodiment is able to cause the transmission of power better suited to the external power recipient device.

In addition, by having a power supply device according to the present embodiment conduct processing like the above in the power control process discussed later, it becomes possible to potentially lower the costs of the power supply unit (discussed later) or other such device that supplies power, and furthermore, efficiently make use of energy and resources. More specifically, in the case where the power-supplying device is equipped with two power circuits, it becomes possible to potentially lower the costs of the power-supplying device by making one an inexpensive power circuit, and the other a high-precision power source. Also, by selecting the power circuit to output the power transmitted to the external power recipient device B in the power control process discussed later, it is possible to potentially improve the efficiency of energy and resource utilization.

In the case of acquiring power receiving capability information from an external power recipient device, a power supply device according to the present embodiment specifies the power receiving capability of the external power recipient device as above, for example. Obviously, however, the process (3) (the power receiving capability specifying process) in the case of acquiring power receiving capability information from an external power recipient device is not limited to the above.

Further, for example, when the identification information is acquired from the external power recipient device, the power supply device according to the present embodiment specifies the power receiving capability of the external power recipient device based on the identification information.

More specifically, for example, the power supply device according to the present embodiment acquires the power receiving capability information corresponding to the acquired identification information from the external power recipient device with reference to a table, in which identification information and power receiving capability information are recorded in association with each other, which is stored in a recording medium such as a storage unit (which will be described later). Then, the power supply device according to the present embodiment specifies compatible electric power represented by the acquired power receiving capability information as the power receiving capability of the external power recipient device.

Further, for example, the power supply device according to the present embodiment may acquire power receiving capability information corresponding to identification information acquired from the external power recipient device from an external device such as the server, and specify compatible electric power represented by the acquired power receiving capability information as the power receiving capability of the external power recipient device. Here, when the power receiving capability information is acquired from the external device, for example, the power supply device according to the present embodiment transmits a power receiving capability information transmission request including identification information and a power receiving capability information transmission command to the external device. Further, for example, the external device that has received the power receiving capability information transmission request specifies the power receiving capability information corresponding to the identification information included in the power receiving capability information transmission request with reference to a database, a table, or the like, and transmits the specified power receiving capability information to the power supply device according to the present embodiment.

The power supply device according to the present embodiment specifies the power receiving capability of the external power recipient device, for example, as described above, in the power receiving capability specifying process.

The power receiving capability specifying process in the power supply device according to the present embodiment is not limited to the above example. For example, the power supply device according to the present embodiment may specify the power receiving capability of the external power recipient device based on a user operation. For example, when the identification number of the external power recipient device or the type of the external power recipient device is input (selected) by the user (for example, the user of the power supply device according to the present embodiment or the user of the external power recipient device) (an example in which a user operation is performed), the power receiving capability of the external power recipient device may be specified based on identification information acquired based on the user operation. Further, for example, when an index (such as the power type, voltage, current, or power frequency, for example) related to electric power supported by the external power recipient device or the like is input (or selected) by the user (an example in which a user operation is performed), the power receiving capability of the external power recipient device may be specified based on power receiving capability information acquired based on the user operation.

(4) Power Control Process

The power supply device according to the present embodiment causes a power supply unit (discussed later) or a power-supplying device such as an external device having similar functionality as the power supply unit (discussed later), for example, to transmit electric power compatible with an external power recipient device on the basis of the power receiving capability specified in the above process (3) (the power receiving capability specifying process), for example. The power supply device according to the present embodiment causes the power supply unit (discussed later) or the like to transmit electric power compatible with the external power recipient device by transmitting a control signal to the power supply unit (discussed later) or the like, for example. Potential examples of a control signal according to the present embodiment herein include a signal containing a command indicating whether or not to convert power, or a signal containing a command indicating whether or not to convert power as well as a command indicating the conversion type.

More specifically, the power supply device according to the present embodiment determines whether electric power supplied from a power source exceeds the specified power receiving capability, for example.

At this point, the power supply device according to the present embodiment determines whether the electric power supplied from a power source exceeds the specified power receiving capability of the external power recipient device by comparing an index related to the electric power supplied from the power source against an index related to the power supported by the external power recipient device as specified by the above process (3) (the power receiving capability specifying process), for example. A preset index (such as 100 V, 50 Hz, for example) is a potential example of such an index related to the power supplied from the power source.

However, the index related to the electric power supplied from the power source is not limited to a preset index. For example, it is also possible for the power supply device according to the present embodiment to specify the power source type, and use an index based on the specified power source type as the index related to the electric power supplied from the power source. The power supply device according to the present embodiment measures the index related to the electric power supplied from the power source, such as the voltage and frequency of the electric power supplied from the power source, for example, and specifies the power source type on the basis of the measurement results. However, the processing related to specifying the power source in a power supply device according to the present embodiment is not limited to the above. For example, the power supply device according to the present embodiment may also specify the power source type on the basis of power source type information which indicates the power source type and which is packetized and transmitted over a power line. It is also possible for the power supply device according to the present embodiment to communicate with an external device such as a server that manages supplied power sources (such as a power company server, for example), and specify the power source type on the basis of power source type information acquired from that external device, for example.

The power supply device according to the present embodiment determines that the electric power supplied from the power source exceeds the power receiving capability of the external power recipient device in the case where, for example, the type of electric power supplied from the power source (DC or AC, for example) differs from the type of electric power supported by the external power recipient device (AC or DC, for example).

In addition, the power supply device according to the present embodiment determines that the electric power supplied from the power source exceeds the power receiving capability of the external power recipient device in the case where, for example, the voltage of the electric power supplied from the power source exceeds the voltage range supported by the external power recipient device (or in the case where the voltage of the electric power supplied from the power source does not conform to the voltage range supported by the external power recipient device; this applies similarly hereinafter). Meanwhile, the power supply device according to the present embodiment does not determine that the electric power supplied from the power source exceeds the power receiving capability of the external power recipient device in the case where, for example, the voltage of the electric power supplied from the power source does not exceed the voltage range supported by the external power recipient device (or in the case where the voltage of the electric power supplied from the power source conforms to the voltage range supported by the external power recipient device; this applies similarly hereinafter). More specifically, the power supply device according to the present embodiment does not determine that the electric power supplied from the power source exceeds the power receiving capability of the external power recipient device in the case where, for example, the electric power supplied from the power source has a voltage of 110 V ($V_{RMS}$) and the external power recipient device supports a voltage range from 100 V to 125 V ($V_{RMS}$). Meanwhile, the power supply device according to the present embodiment may, for example, determine that the electric power supplied from the power source exceeds the power receiving capability of the external power recipient device in the case where, for example, the electric power supplied from the power source has a voltage of 130 V or 99 V ($V_{RMS}$) and the external power recipient device supports a voltage range from 100 V to 125 V ($V_{RMS}$).

However, the processing in the power supply device according to the present embodiment related to determining whether or not electric power supplied from a power source exceeds a specified power receiving capability is not limited to the examples given above. For example, it is also possible for the power supply device according to the present embodiment to not determine that the electric power supplied from the power source exceeds the power receiving capability of the external power recipient device in the case where the voltage of the power supplied from the power source is below the voltage range supported by the external power recipient device, such as when the electric power supplied from the power source has a voltage of 99 V ($V_{RMS}$) and the external power recipient device supports a voltage range from 100 V to 125 V ($V_{RMS}$). The manufacturer or user of the power supply device according to the present embodiment, for example, may set whether or not the power supply device according to the present embodiment determines that electric power supplied from a power source exceeds the power receiving capability of an external power recipient device in the case where the voltage of the power supplied from the power source is below the voltage range supported by the external power recipient device.

In the case where the determination result does not indicate that the power receiving capability has been exceeded, the power supply device according to the present embodiment causes the power supply unit (discussed later) or the like to transmit electric power supplied from a power source, for example.

Meanwhile, in the case where the determination result indicates that the power receiving capability has been exceeded, the power supply device according to the present embodiment causes the power supply unit (discussed later) or the like to convert the electric power supplied from the power source into electric power compatible with the external power recipient device which does not exceed the specified power receiving capability. The power supply device according to the present embodiment then causes the power supply unit (discussed later) or the like to transmit the converted electric power.

At this point, the power supply device according to the present embodiment may also select a power circuit suited to the demands of the external power recipient device from among the power circuits provided in the power supply unit (discussed later) or the like on the basis of the power receiving capability specified in the above process (3) (the power receiving capability specifying process) as discussed earlier, and cause the selected power circuit to output electric power, for example.

In addition, in the case where priority levels are set in the power receiving capability information (an example of information related to power receiving capability) as discussed earlier, the power supply device according to the present embodiment may also convert electric power supplied from the power source into electric power with a higher set priority level, and cause the converted power to be transmitted, for example.

In the power control process, the power supply device according to the present embodiment causes the transmission of electric power compatible with the external power recipient device as discussed earlier, for example.

However, the power control process in a power supply device according to the present embodiment is not limited to the above. For example, the power supply device according to the present embodiment may also cause the power supply unit (discussed later) or the like to not transmit power in the case of not determining that an external power recipient device is connected to a power line in the above process (1) (the connection state determining process). The power supply device according to the present embodiment causes the power supply unit (discussed later) or the like to not transmit power by transmitting a control signal to the power supply unit (discussed later) or the like and setting the output from the power supply unit (discussed later) to 0 V (in other words, earth) or to an insulating state. By causing power to not be transmitted as above in the case of not determining that the external power recipient device is connected to a power line, the power supply device according to the present embodiment is able to prevent electric shock to the user.

For example, when it is difficult to transmit compatible electric power to the external power recipient device due to the function of the power supply unit (which will be described later) or the like, the power supply device according to the present embodiment does not transmit electric power to the external power recipient device (an exceptional process). For example, the power supply device according to the present embodiment transfers the control signal to the power supply unit (which will be described later) and thus controls transmission of electric power to the external power recipient device.

As the exceptional process is performed as described above, electric power that exceeds the power receiving capability of the external power recipient device (power receiving device) can be prevented from being supplied to the external power recipient device. Thus, as the exceptional process is performed as described above, for example, the power supply device according to the present embodiment can prevent the occurrence of an undesired situation in which the external power recipient device is damaged.

Further, when electric power is caused not to be transmitted to the external power recipient device, for example, the power supply device according to the present embodiment may notify the user of the external power recipient device of the fact that electric power is not transmitted (an example of an exceptional notification). For example, the power supply device according to the present embodiment may give a notification to the user of the external power recipient device by a visual notification method using text, an image, or the like, or an auditory notification method using a sound (including music or a beep sound; the same applies hereinafter). Here, for example, the power supply device according to the present embodiment may give a notification through a display unit (which will be described later) or an audio output device provided in the device itself (the power supply device according to the present embodiment), an external display device, an external audio output device, an external device such as the external power recipient device, or the like.

For example, the power supply device according to the present embodiment performs the process (1) (the connection state determining process) to the process (4) (the power control process) as the process related to the power supply method according to the present embodiment. Here, the power supply device according to the present embodiment transmits corresponding electric power to the external device (the power receiving device) of the power supply target based on the power receiving capability specified in the process (3) (the power receiving capability specifying process) in the process (4) (the power control process) (the principle processing). Further, the power supply device according to the present embodiment performs the process (3) (the power receiving capability specifying process) based on information related to the power receiving capability corresponding to the external power recipient device acquired in the process (2) (the power source specifying process). Thus, electric power that the power supply device according to the present embodiment transmits to the external device of the power supply target through the process (4) (the power control process) corresponds to the external device of the power supply target.

Thus, the power supply device according to the present embodiment can cause an external power recipient device to receive power compatible with the external power recipient device by performing the process (1) (the connection state determining process) to the process (4) (the power control process) as the process related to the power supply method according to the present embodiment.

Further, the power supply device according to the present embodiment performs the process (1) (the connection state determining process) to the process (4) (the power control process), and thus, for example, the situation in which electric power is not transmitted even though the external power recipient device to receive power is connected to the power supply device is prevented. Thus, the power supply device according to the present embodiment performs, for example, the process (1) (the connection state determining process) to the process (4) (the power control process), and thus the user's convenience can be improved.

In addition, it is also possible for the power supply device according to the present embodiment to cause electric power compatible with the external power recipient device to be transmitted by the above process (4) (the power control process). Thus, it is possible to cause a power receiving device or the like to receive compatible electric power even if the power receiving device lacks an AC-DC adapter made up of components such as a transformer, rectifier, and stabilizer circuit, or a converter device such as an AC-AC adapter, which have been necessary for existing equipment. Also, by making it possible to omit a converter device as above, it is possible to potentially improve user convenience (for example, the user no longer has to carry around a converter device), and in addition, manufacturers who manufacture and sell power receiving devices and the like are able to further reduce costs. Furthermore, by causing the transmission of power compatible with an external power recipient device, the efficiency of resource and energy utilization is potentially improved.

Also, since the power supply device according to the present embodiment causes power compatible with the external power recipient device to be transmitted by the above process (4) (the power control process), the power supply device according to the present embodiment is able to, for example, convert an AC power source and cause DC power to be transmitted to the external power recipient device. Thus, wiring becomes possible in which an AC power source is supplied from the electric switchboard of a building to the power-supplying device such as the power supply unit (discussed later), with the power source being converted at the power-supplying device. At this point, it is anticipated that voltage values will become high voltages in consideration of loss in the case where the wiring supplies a DC power source to an outlet or the like from the electric switchboard of a building such as a home, for example. Additionally, thicker cables may be warranted because of the increased risk of electric shock from DC voltage and DC current in the case where the wiring supplies a DC power source to an outlet or the like from the electric switchboard of a building such as a home, for example. In contrast, using the power supply device according to the present embodiment enables the wiring to supply an AC power source from the electric switchboard to the power-supplying device such as the power supply unit (discussed later), even in the case of transmitting DC power to an external power recipient device. For this reason, wiring is possible without delivering a DC power source over long lengths of thick cables, and in addition, it is possible to ensure a level of safety similar to existing cases where the wiring supplies an AC power source. Consequently, by using a power supply device according to the present embodiment that conducts processes in accordance with a power supply method according to the present embodiment, it becomes possible to provide a safer power source solution, even in the case of transmitting DC power to an external power recipient device.

Note that since the power supply device according to the present embodiment causes power compatible with the external power recipient device to be transmitted by the above process (4) (the power control process), it is possible to make the external power recipient device receive electric power compatible with the external power recipient device, even in the case where the wiring supplies a DC power source from the electric switchboard of the building to the power-supplying device such as the power supply unit (discussed later), for example. As an example of the above, the power supply device according to the present embodiment may make the voltage of the DC power transmitted to the external power recipient device a low voltage such as 5 V or 12 V, for example. Thus, by using the power supply device according to the present embodiment, it becomes possible to use a DC power source such as the storage battery of an uninterruptible power supply (UPS) or a photovoltaic (PV) solar panel power source as a DC power source, without regenerating an AC power source, for example. Consequently, it is possible to potentially improve the efficiency of resource and energy utilization in the case where the wiring supplies a DC power source from the electric switchboard of the building to the power-supplying device such as the power supply unit (discussed later), for example.

Next, an example of a process in accordance with a power supply method according to the embodiment will be described, taking as an example the case where the power source is an existing AC power source such as an electric utility, and the power supply device according to the present embodiment has ascertained the power source.

FIG. 1 is a flowchart illustrating an example of a process in accordance with a power supply method in a power supply device according to the present embodiment. Herein, the process in step S100 illustrated in FIG. 1 corresponds to the above process (1) (the connection state determining process), while step S104 illustrated in FIG. 1 corresponds to the above process (2) (the communication control process). Also, the processes in steps S106 and S110 illustrated in FIG. 1 correspond to the above process (3) (the power receiving capability specifying process), while steps S102, S108, and S112 to S116 illustrated in FIG. 1 correspond to the above process (4) (the power control process).

The power supply device according to the embodiment determines whether or not a connection to an external power recipient device and a power line has been detected (S100). The power supply device according to the present embodiment determines the connection state at a connecting unit (discussed later) or the like, on the basis of a detection signal transmitted from the connecting unit (discussed later) or the like, for example.

In the case of not determining that a connection to an external power recipient device has been detected in step S100, the power supply device according to the present embodiment does not induce power transmission (S102). The power supply device according to the present embodiment then repeats the process starting from step S100.

Meanwhile, in the case of determining that a connection to an external power recipient device has been detected in step S100, the power supply device according to the present embodiment acquires information related to the power receiving capability corresponding to the external power recipient device (S104). At this point, the power supply device according to the present embodiment acquires information related to the power receiving capability corresponding to the external power recipient device by causing the wireless communication unit (discussed later) to transmit a transmission request containing a transmission command causing information related to power receiving capability to be transmitted, for example.

After conducting the processing in step S104, the power supply device according to the present embodiment determines whether or not information related to power receiving capability has been acquired (S106).

In the case of not determining that information related to power receiving capability has been acquired in step S106, the power supply device according to the present embodiment determines that the external power recipient device detected in step S100 is compatible with an existing AC power source such as an electric utility, for example, and causes electric power to be transmitted from the power source (S108). However, the processing conducted in the case of not determining that information related to power receiving capability has been acquired in step S106 is not limited to the above. For example, the power supply device according to the present embodiment may also not cause electric power be transmitted in the case of not determining that information related to power receiving capability has been acquired in step S106. The power supply device according to the present embodiment conducts processing in the case of not determining that information related to power receiving capability has been acquired on the basis of a setting related to power transmission that is set by the manufacturer of the power supply device according to the present embodiment or the like, for example.

Meanwhile, in the case of determining that information related to power receiving capability has been acquired in step S106, the power supply device according to the present embodiment specifies the power receiving capability of the external power recipient device on the basis of the acquired information related to power receiving capability (S110).

After conducting the processing in step S110, the power supply device according to the present embodiment determines whether or not to convert the electric power supplied from the power source (S112). At this point, the power supply device according to the present embodiment may determine whether the electric power supplied from the power source exceeds the specified power receiving capability, and determine to convert the power supplied from the power source in the case of determining that the power receiving capability has been exceeded. Meanwhile, the power supply device according to the present embodiment does not determine to convert the power supplied from the power source in the case of not determining that the power receiving capability has been exceeded.

In the case of not determining to convert the electric power supplied from the power source in step S112, the power supply device according to the present embodiment causes the electric power supplied from the power source to be transmitted to the external power recipient device (S120). The power supply device according to the present embodiment conducts the processing in step S120 by transmitting a control signal to the power supply unit (discussed later) or the like, for example.

Meanwhile, in the case of determining to convert the electric power supplied from the power source in step S112, the power supply device according to the present embodiment determines whether or not the electric power supplied from the power source is convertible (S114). The power supply device according to the present embodiment does not determine that the electric power supplied from the power source is convertible in the case where the power supply unit (discussed later) or the like is not able to convert the electric power supplied from the power source into power compatible with the external power recipient device (such as in the case where the performance demanded to convert the electric power supplied from the power source exceeds the conversion performance of the power supply unit (discussed later) or the like, for example).

In the case of not determining that the electric power supplied from the power source is convertible in step S114, the power supply device according to the present embodiment does not cause electric power to be transmitted to the external power recipient device (S116).

Meanwhile, in the case of determining that the electric power supplied from the power source is convertible in step S114, the power supply device according to the present embodiment causes the electric power supplied from the power source to be converted (S118). The power supply device then causes the converted electric power to be transmitted to the external power recipient device (S120). The power supply device according to the present embodiment conducts the processing in step S120 by transmitting a control signal to the power supply unit (discussed later) or the like, for example.

For example, the power supply device according to the present embodiment performs the process illustrated in FIG. 1 as the process related to the power supply method. Through the process illustrated in FIG. 1, the process (1) (the connection state determining process) to the process (4) (the power control process) are implemented. Thus, for example, by performing the process illustrated in FIG. 1, the power supply device according to the present embodiment can cause electric power that is compatible with the external power recipient device to be received by the external power recipient device. Further, for example, by performing the process illustrated in FIG. 1, the power supply device according to the present embodiment can improve the user's convenience.

However, the process related to a power supply method in a power supply device according to the present embodiment is not limited to the process illustrated in FIG. 1. For example, the power supply device according to the present embodiment may perform the authentication process of performing authentication on the external power recipient device, and selectively transmit electric power to the external power recipient device based on the authentication result.

More specifically, for example, the power supply device according to the present embodiment performs authentication on the external power recipient device based on identification information corresponding to the external power recipient device (an example of information related to power supply capability) acquired in step S104 illustrated in FIG. 1. For example, the power supply device according to the present embodiment performs authentication on the external power recipient device based on whether or not identification information corresponding to the identification information acquired from the external power recipient device remains stored in a database in which identification information representing external devices allowed to be supplied with electric power is recorded. Here, the database may be stored in a recording medium such as a storage unit (which will be described later), and the power supply device according to the present embodiment may acquire the database from an external device such as a server.

Here, when it is determined that the external device of the power supply target has been authenticated normally, the power supply device according to the present embodiment performs the process of step S110 illustrated in FIG. 1. However, when it is determined that the external device of the power supply target has not been authenticated normally, the power supply device according to the present embodiment does not transmit electric power to the external device of the power supply target.

Furthermore, although FIG. 1 illustrates an example of the case where the power source is an existing AC power source such as an electric utility, or in other words, a process related to a power supply method according to the present embodiment in a power supply device according to the present embodiment, a process related to a power supply method according to the present embodiment is not limited to the above. For example, the power supply device according to the present embodiment may also specify a type of power source, selectively convert electric power supplied from the specified power source on the basis of the specified power receiving capability of the external power recipient device, and cause the selectively convened electric power to be transmitted to the external power recipient device. The power supply device according to the present embodiment may specify a type of power source on the basis of measurement results for an index related to power supplied from the power source, power source type information acquired via a power line, or power source type information acquired by communication with an external device, for example.

(Wireless Communication According to the Present Embodiment)

Next, communication conducted between a power supply device and an external power recipient device according to a process related to a power supply method according to the present embodiment discussed above will be described. Hereinafter, wireless communication according to the present embodiment will be described, taking as an example the case where a power supply device according to the present embodiment wirelessly communicates with a power receiving device according to the present embodiment.

For example, wireless communication is performed between the power supply device according to the present embodiment and the power receiving device according to the present embodiment using a wireless communication technology such as a communication technology based on Near Field Communication (NFC) or Radio Frequency Identification (RFID) technology.

For example, the power supply device according to the present embodiment includes a high-frequency signal generating unit (which will be described later) that generates a high-frequency signal, and transmits the high-frequency signal to an external device connected in a wired manner by a power line (this device corresponds to the external power recipient device according to the present embodiment). In other words, the power supply device according to the present embodiment has, for example, a so-called reader/writer function.

Further, the power receiving device according to the present embodiment (an example of an external power recipient device according to the present embodiment), for example, communicates with an external device such as the power supply device according to the present embodiment by performing load modulation based on a signal transmitted from the external device. For example, when the power receiving device according to the present embodiment receives the high-frequency signal transmitted from the power supply device according to the present embodiment, the power receiving device is driven by power obtained from the received high-frequency signal, performs the load modulation based on a result of processing the received high-frequency signal, and thus transmits a high-frequency signal.

For example, as the power supply device according to the present embodiment and the power receiving device according to the present embodiment perform the above-described processes, respectively, the wireless communication according to the present embodiment is implemented between the power supply device according to the present embodiment and the power receiving device according to the present embodiment.

Here, the high-frequency according to the present embodiment is a signal having a higher frequency than the frequency of the electric power, for example. Examples of the high-frequency signal according to the present embodiment include a signal at a frequency used in RFID and a signal at a frequency used in contactless communication. Examples of the frequency of the high-frequency signal include 130 to 135 kHz, 13.56 MHz, 56 MHz, 433 MHz, 954.2 MHz, 954.8 MHz, 2441.75 MHz, and 2448.875 MHz, but the frequency of the high-frequency signal according to the present embodiment is not limited to the above examples. In the following, a high frequency wave transmitted on the basis of the high-frequency signal according to the present embodiment may be referred to as a "carrier wave."

The wireless communication according to the present embodiment is not limited to communication using a wireless communication technology such as a communication technology based on NFC or RFID technology. For example, wireless communication in an arbitrary scheme such as wireless communication based on IEEE 802.15.1 (also referred to as "Bluetooth" (registered trademark)), wireless communication based on IEEE 802.11b (also referred to as "Wi-Fi"), or wireless communication based on ZigBee (registered trademark) may be performed between the power supply device according to the present embodiment and an external power recipient device such as the power receiving device according to the present embodiment. In the following, the wireless communication according to the present embodiment will be described in connection with an example in which wireless communication using a wireless communication technology such as a communication technology based on NFC or RFID technology is performed between the power supply device according to the present embodiment and an external power recipient device such as the power receiving device according to the present embodiment.

Figure 2:
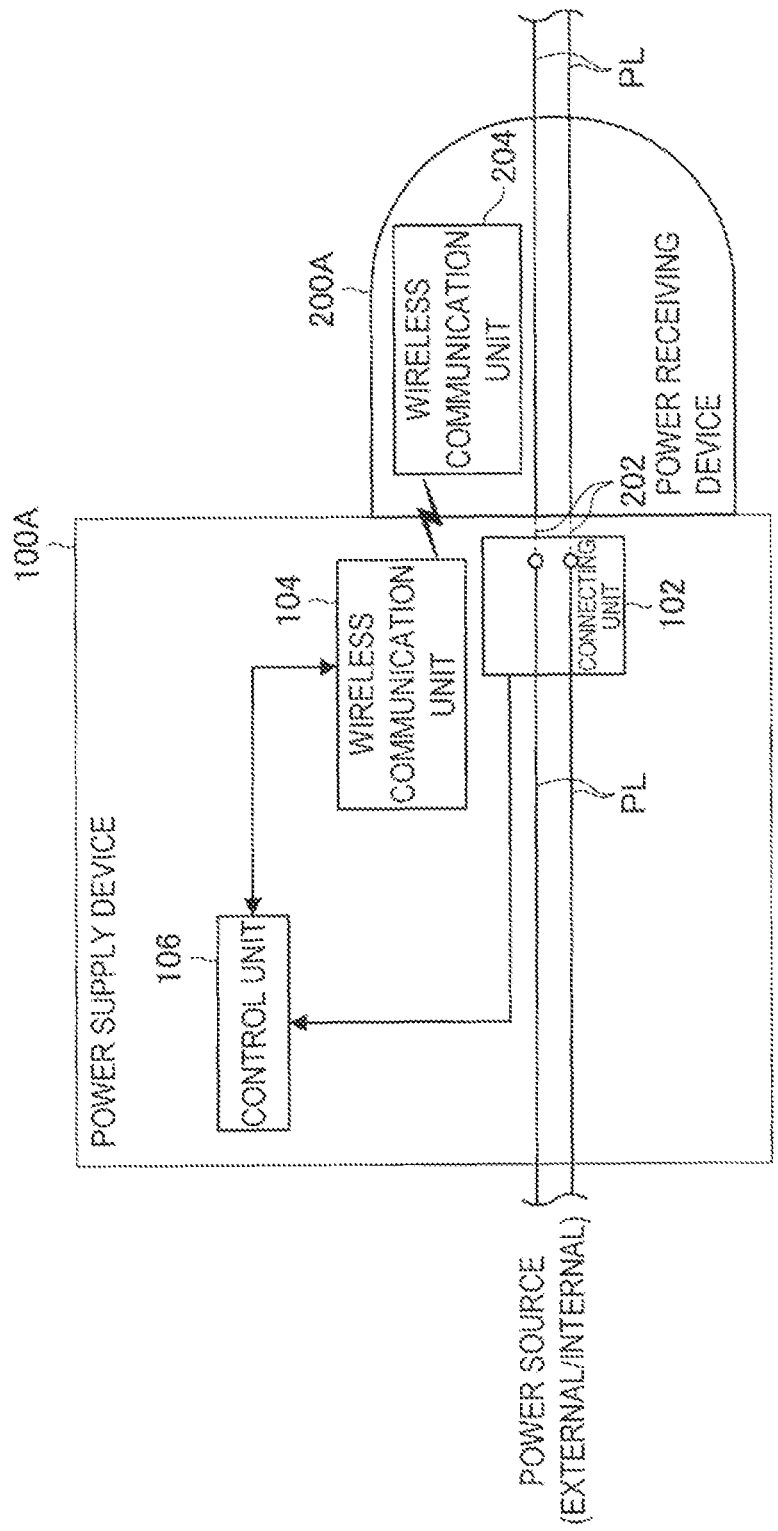
FIG. 2 is an explanatory diagram for illustrating an example of wireless communication according to the present embodiment.

FIG. 2 is an explanatory diagram for describing an example of the wireless communication according to the present embodiment. In the following, the wireless communication according to the present embodiment will be described using a power supply device 100A and a power receiving device 200A illustrated in FIG. 2 as an example. In addition. FIG. 2 illustrates structural elements related to the wireless communication according to the present embodiment in a configuration of the power supply device according to the present embodiment and a configuration of the power receiving device according to the present embodiment. Further, FIG. 2 illustrates a plug for connecting to a power line (more specifically, a device having a plug member) as the power receiving device 200A, but the power receiving device according to the present embodiment is not limited to a plug.

For example, the power supply device 100A includes a connecting unit 102, a wireless communication unit 104, and a control unit 106. Further, for example, the power receiving device 200A includes a connecting unit 202 and a wireless communication unit 204.

The connecting unit 102 connects a power line PL through which power is transmitted to an external device. Further, the connecting unit 102 may include a connection supporting member that supports the maintenance of a connection state of the connected external device. Here, a power line through which an alternating current (AC) having a predetermined frequency such as 50 Hz or 60 Hz or a direct current (DC) flows may be used as the power line PL according to the present embodiment. Further, for example, a magnet may be used as the connection supporting member according to the present embodiment. In the following, the description will proceed in connection with an example in which an AC current having a predetermined frequency flows through the power line PL.

More specifically, the connecting unit 102 has a terminal connected to the power line PL, and the connecting unit 202 has a plug member (power line connecting plug) connected to the power line PL (which corresponds to an external power line when seen from the power supply device 100A). Further, when the terminal of the connecting unit 102 is electrically connected to the plug member of the connecting unit 202, the power supply device 100A is connected to the power receiving device 200A (which corresponds to an external device when seen from the power supply device 100A). Here, an "electrical connection between the terminal of the connecting unit 102 and the plug member of the connecting unit 202" according to the present embodiment refers to, for example, a contact between the connecting units of the devices and the plug member, or a wired connection between the connecting units of the devices and the plug member. In addition, the connecting unit 202 may include a connection supporting member that supports the maintenance of a connection state of the connected external device, similarly to the connecting unit 102 of the power supply device 100A.

For example, the connecting unit 102 detects a change in the connection state of the external device (a change from the unconnected state to the connected state or a change from the connected state to the unconnected state). Then, the connecting unit 102 transfers a detection signal representing the detection (detection result) to the control unit 106. In addition, when the wireless communication unit 104 has a function of transmitting the high-frequency signal in response to the transfer of the detection signal, the connecting unit 102 may transfer the detection signal to the wireless communication unit 104. Further, the connecting unit 102 may transmit the detection signal to, for example, a power supply unit (later described) that the power supply device according to the present embodiment includes.

In this case, the connecting unit 102 may be provided with a switch or sensor that detects the physical connection state of an external device, and may issue a detection signal to the control unit 106 or elsewhere when the state of the switch changes or when the sensor detects an object, for example. The above switch may be a mechanical switch or a mechanism that detects the plug member (the plug that connects to a power line), for example. The above sensor may also be an infrared sensor, a Hall effect sensor, a motion or presence sensor, or a micro airflow sensor, for example.

By issuing the above detection signal to the control unit 106 or elsewhere, the power supply device according to the present embodiment is able to initiate wireless communication after detecting that an external device is connected to the connecting unit 102. Additionally, equipping the connecting unit 102 with a switch or sensor yields the following advantages, for example.

It becomes possible to determine whether an external device is in a correctly connected state, and thus prevent power leakage when the external device is in a partially connected state.

It becomes possible to reduce standby power to near zero by initiating wireless communication after an external device is correctly connected, thus reducing power consumption related to wireless communication (approximately 0.5 W to 1 W of power is consumed when outputting a carrier wave, for example).

It becomes possible to determine whether an external device is in a correctly connected state, and thus detect when a device lacking wireless communication functionality has been connected. In addition, it is possible to notify the user that a device lacking wireless communication functionality has been connected (such as with a visual notification or auditory notification through a user interface (UI), for example), and prompt the user to select whether or not to supply power.

However, the configuration of the connecting unit 102 according to the present embodiment is not limited to the above. For example, it is also possible for the connecting unit 102 according to the present embodiment to not include functionality related to detecting changes in the connection state of an external device, for example, in the case where the power supply device 100A is configured to periodically or non-periodically transmit a high-frequency signal (or in other words, a configuration that conducts polling periodically (such as every 1 s or 5 s, for example) or non-periodically).

The wireless communication unit 104 and the wireless communication unit 204 undertake the wireless communication according to the present embodiment. Further, for example, the communication in the wireless communication unit 104 is controlled by the control unit 106.

The control unit 106 includes a Micro Processing Unit (MPU) or an integrated circuit (IC) in which various kinds of processing circuits are integrated, and controls the components of the power supply device 100A. More specifically, for example, the control unit 106 transfers a high-frequency signal generation command or a high-frequency signal transmission stop command to a wireless communication unit 104 based on the detection signal transferred from the connecting unit 102 or a response signal of the connected external device such as a power receiving device 200A transferred from the wireless communication unit 104, and controls the communication in the wireless communication unit 104.

Further, the control unit 106 actively undertakes the process (for example, the processes from (1) (the connection state determining process) to (4) (the power control process)) related to the power supply method according to the present embodiment. In the control unit 106 of the power supply device according to the present embodiment, a configuration for implementing the process related to the power supply method according to the present embodiment will be described later.

Figure 3:
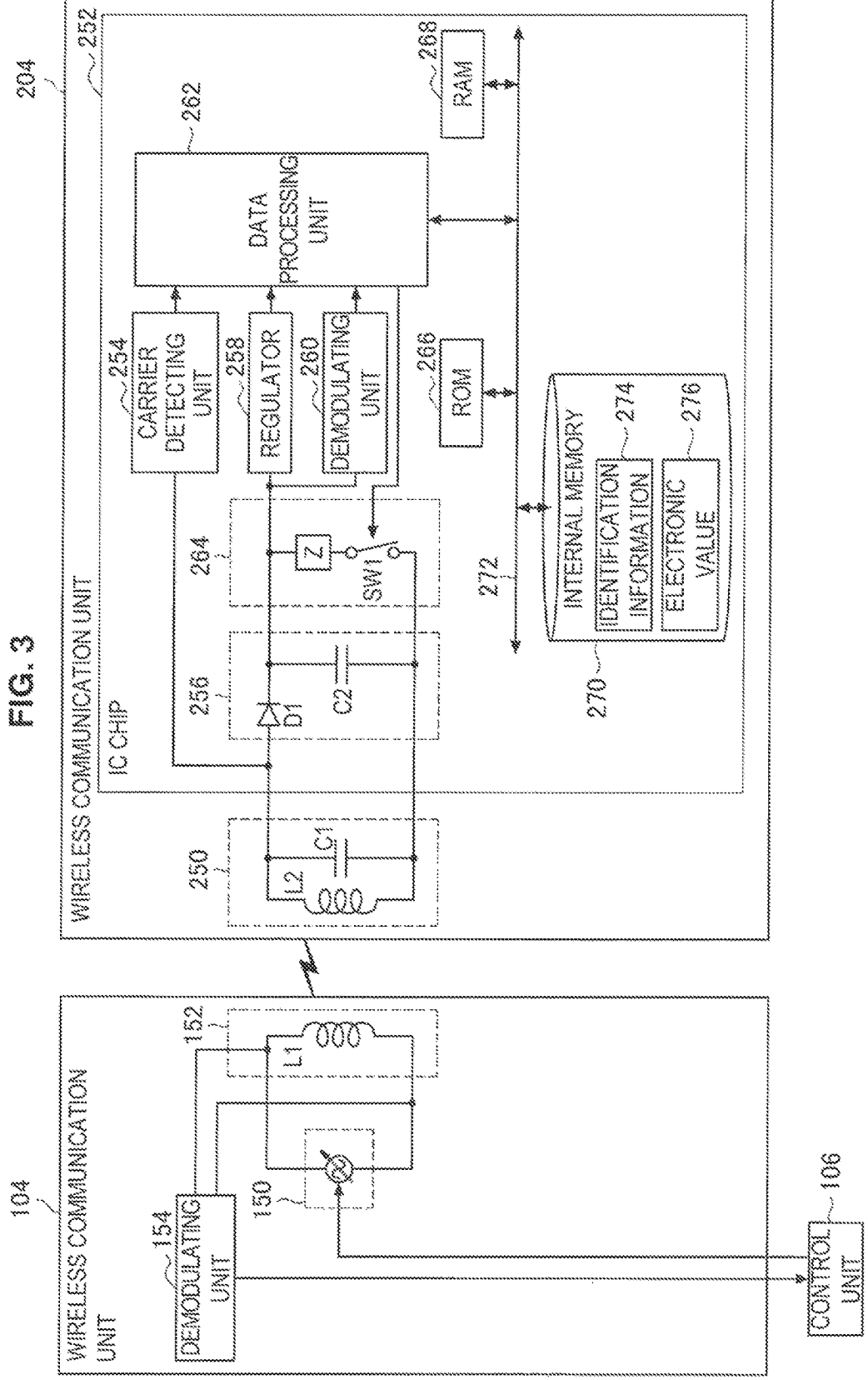
FIG. 3 is an explanatory diagram illustrating an exemplary configuration for realizing wireless communication conducted between a power supply device according to the present embodiment and an external power recipient device according to the present embodiment.

FIG. 3 is an explanatory diagram illustrating an example of a configuration for implementing wireless communication performed between the power supply device according to the present embodiment and the external device of the power supply target according to the present embodiment. Here, FIG. 3 illustrates an example of configurations of the wireless communication unit 104 and the control unit 106 arranged in the power supply device 100A illustrated in FIG. 2 and the wireless communication unit 204 arranged in the power receiving device 200A (an example of the external power recipient device according to the present embodiment) illustrated in FIG. 2.

1-1. Wireless Communication Unit 104 Arranged in Power Supply Device According to Present Embodiment For example, the wireless communication unit 104 includes a high-frequency signal generating unit 150, a high-frequency transmitting unit 152, and a demodulating unit 154. For example, the wireless communication unit 104 transmits the high-frequency signal in response to the high-frequency signal generation command transferred from the control unit 106, and stops transmission of the high-frequency signal in response to the high-frequency signal transmission stop command transferred from the control unit 106. In the wireless communication unit 104 herein, the high-frequency transmitting unit 152 fulfills the role of a communication antenna that transmits a carrier wave according to a high-frequency signal, while the high-frequency signal generating unit 150 and the demodulating unit 154 fulfill the role of a communication processor that transmits the high-frequency signal via the communication antenna to communicate with the external power recipient device, for example.

The wireless communication unit 104 may include, for example, an encryption circuit (not shown) for encrypting communication, a communication anti-collision circuit, or a connection interface (not shown) for connecting an external device with another circuit. Here, for example, the structural elements of the wireless communication unit 104 are connected to each other via a bus serving as a transmission path of data. Examples of the connection interface include a Universal Asynchronous Receiver Transmitter (UART), a Local Area Network (LAN) terminal, and a transceiving circuit.

The high-frequency signal generating unit 150 receives the high-frequency signal generation command from the control unit 106, and generates a high-frequency signal corresponding to the high-frequency signal generation command. Here, in FIG. 3, AC power is used as the high-frequency signal generating unit 150, but the high-frequency signal generating unit 150 according to the present embodiment is not limited to this example. For example, the high-frequency signal generating unit 150 according to the present embodiment may include a modulating circuit (not shown) that performs prescribed modulation such as Amplitude Shift Keying (ASK) and an amplifying circuit (not shown) that amplifies an output of the modulating circuit.

Here, for example, a high-frequency signal including the identification information transmission request to request the external connection device to transmit the identification information, a high-frequency signal including the receiving capability information transmission request to request the external connection device to transmit the receiving capability information, or a high-frequency signal including various kinds of processing commands or data to be processed may be used as the high-frequency signal generated by the high-frequency signal generating unit 150. However, the high-frequency signal generated by the high-frequency signal generating unit 150 is not limited to this example. For example, the high-frequency signal according to the present embodiment may be a signal (for example, a non-modulated signal) causing the wireless communication unit 204 of the power receiving device 200A to perform power supply.

For example, the high-frequency transmitting unit 152 includes a coil 26 (hereinafter, referred to as inductor) L1 having a predetermined inductance, and transmits the carrier wave corresponding to the high-frequency signal generated by the high-frequency signal generating unit 150. Further, the high-frequency transmitting unit 152 can receive the response signal from the connected external device. In other words, the high-frequency transmitting unit 152 can fulfill the role of a communication antenna of the wireless communication unit 104. Here, FIG. 3 illustrates the example in which the high-frequency transmitting unit 152 includes the coil L1, but the configuration of the high-frequency transmitting unit 152 according to the present embodiment is not limited to this example. For example, the high-frequency transmitting unit according to the present embodiment may further include a capacitor to configure a resonance circuit.

In addition, the coil L1 provided in the high-frequency transmitting unit 152 is disposed near a terminal (a metal contact terminal, for example) connected to the power line of the connecting unit 102 in the power supply device according to the present embodiment, for example.

Figure 4:
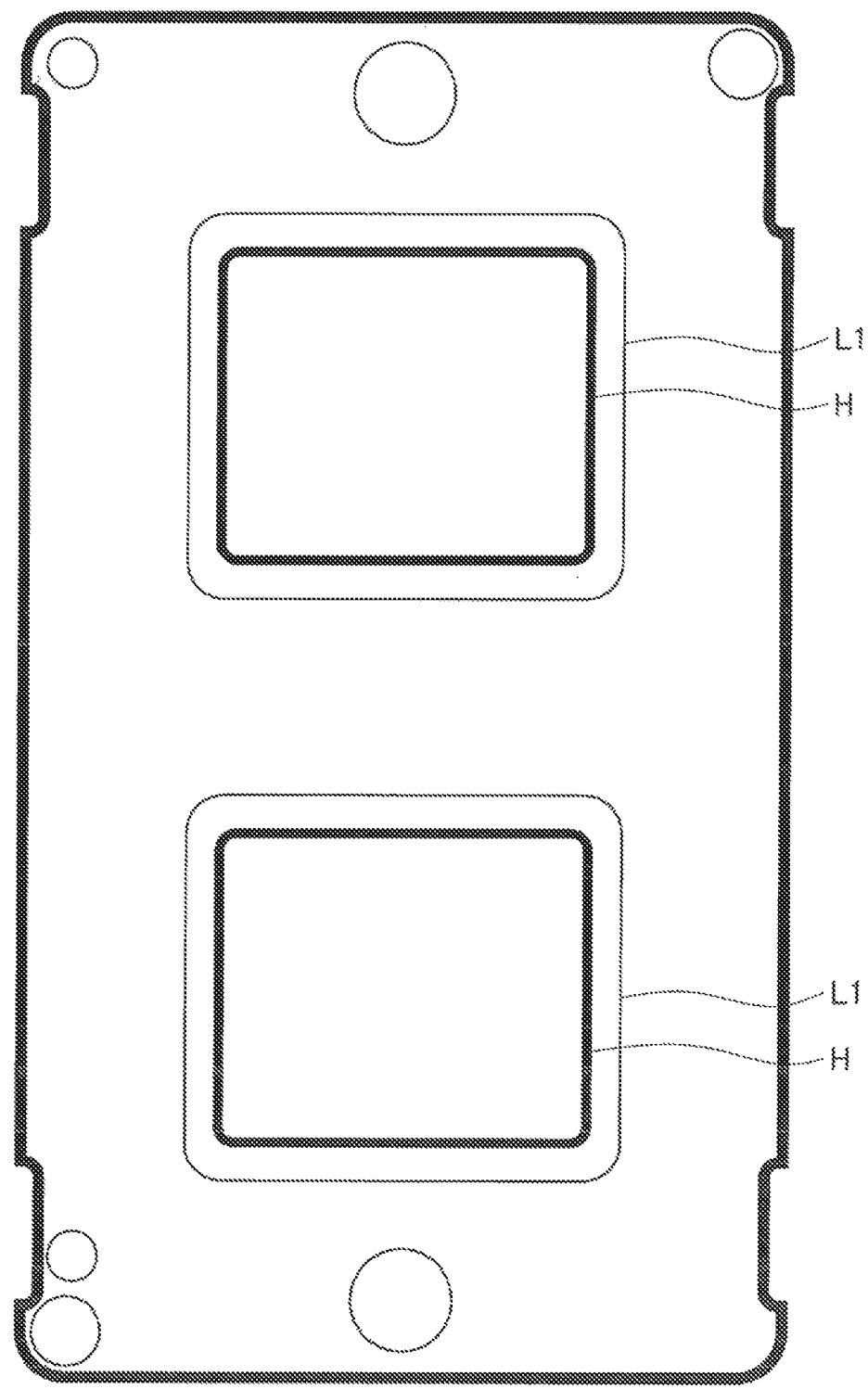
FIG. 4 is an explanatory diagram illustrating an exemplary layout of a high-frequency transmitting unit that fulfills the role of a communication antenna in a power supply device according to the present embodiment.

FIG. 4 is an explanatory diagram illustrating an exemplary layout of a high-frequency transmitting unit 152 that fulfills the role of a communication antenna in the power supply device according to the present embodiment. FIG. 4 illustrates an exemplary layout of the high-frequency transmitting unit 152 (communication antenna) in the case where the power supply device according to the present embodiment is a power outlet furnished in a building or the like, and illustrates a base plate provided with structural elements related to a power supply method according to the present embodiment, such as the wireless communication unit 104 and the control unit 106. Also, L1 illustrated in FIG. 4 represents an example of the coil L1 provided in the high-frequency transmitting unit 152, while H illustrated in FIG. 4 represents a hole through which the connecting unit 102 is inserted.

As illustrated in FIG. 4, the high-frequency transmitting unit 152 that fulfills the role of a communication antenna is disposed so as to surround the connecting unit 102. Note that although FIG. 4 illustrates an example of the coil L1 provided in the high-frequency transmitting unit 152 (communication antenna) having a rectangular (or nearly square) shape, the shape of the coil L1 provided in the high-frequency transmitting unit 152 is not limited to the example illustrated in FIG. 4. For example, the coil L provided in the high-frequency transmitting unit 152 may also be circular (or elliptical).

Although FIG. 4 herein illustrates an example in which the center position in the connecting unit 102 is aligned with the center position of the high-frequency transmitting unit 152 (communication antenna) disposed around the connecting unit 102, the layout of the high-frequency transmitting unit 152 according to the present embodiment is not limited to the example illustrated in FIG. 4. For example, the center position of the high-frequency transmitting unit 152 disposed around the connecting unit 102 may also be horizontally and/or vertically offset from the center position in the connecting unit 102.

FIG. 5 is an explanatory diagram illustrating other exemplary layouts of the high-frequency transmitting unit 152 that fulfills the role of a communication antenna in the power supply device according to the present embodiment. The portion labeled A in FIG. 5 illustrates an exemplary layout of the high-frequency transmitting unit 152 (communication antenna) for the case of a duplex outlet as illustrated in FIG. 4, or in other words, the case where two connecting units 102 exist, enabling the use of two external devices as external power recipient devices. Meanwhile, the portion labeled B in FIG. 5 illustrates an exemplary layout of the high-frequency transmitting unit 152 for the case of a simplex outlet, or in other words, the case where one connecting unit 102 exists, enabling the use of one external device as an external power recipient device. In addition, C1 illustrated in FIG. 5 represents the center position of the high-frequency transmitting unit 152 disposed around the connecting unit 102, while C2 illustrated in FIG. 5 represents the center position in the connecting unit 102.

In the case where multiple connecting units 102 exist as illustrated in FIG. 4, for example, the high-frequency transmitting unit 152 that fulfills the role of a communication antenna is disposed so as to surround each connecting unit 102. In the case where the high-frequency transmitting unit 152 (communication antenna) is disposed so as to surround each connecting unit 102, there is a short distance between the coils L1 provided in the respective high-frequency transmitting units 152 surrounding each connecting unit 102. For this reason, there is a non-zero possibility that an external device connected to one connecting unit 102 will communicate with the high-frequency transmitting unit 152 disposed so as to surround the other connecting unit 102.

Thus, in the power supply device according to the present embodiment, the center positions of the respective high-frequency transmitting units 152 (communication antennas) disposed around each connecting unit 102 are vertically offset from the center positions in the connecting units 102, as illustrated by A in FIG. 5, for example. In other words, in the power supply device according to the present embodiment, the high-frequency transmitting unit 152 that fulfills the role of a communication antenna is disposed offset from the connecting unit 102. By vertically offsetting the center positions of the respective high-frequency transmitting units 152 disposed around each connecting unit 102 from the center positions in the connecting units 102 as illustrated by A in FIG. 5, for example, it becomes possible to increase the distance between the coils L1 provided in the respective high-frequency transmitting units 152 surrounding each connecting unit 102.

Consequently, by vertically offsetting the center positions of the respective high-frequency transmitting units 152 (communication antennas) disposed around each connecting unit 102 from the center positions in the connecting units 102 as illustrated by A in FIG. 5, for example, the power supply device according to the present embodiment is able to prevent miscommunication with an external power recipient device according to the present embodiment.

Note that although A in FIG. 5 illustrates an example of vertically offsetting the center positions of the respective high-frequency transmitting units 152 (communication antennas) disposed around each connecting unit 102 from the center positions in the connecting units 102, in the power supply device according to the present embodiment it is also possible to offset the center positions of the respective high-frequency transmitting units 152 from the center positions in the connecting units 102 horizontally, or both vertically and horizontally.

Additionally, in the case of laying out the power supply device according to the present embodiment with an offset as illustrated by A in FIG. 5, for example, the coil L1 of the high-frequency transmitting unit 152 (communication antenna) may be extended in a direction other than the offset direction (such as in the direction of the arrows indicated in FIG. 5, for example). Since extending the coil L1 of the high-frequency transmitting unit 152 in a direction other than the offset direction as above makes it possible to increase the surface area of the opening in the high-frequency transmitting unit 152, it is possible to improve the communication distance.

Although the above illustrates an example of offsetting in the case of two connecting units 102 by taking A in FIG. 5 as an example, offsetting according to the present embodiment is not limited to the case of two connecting units 102. For example, in the power supply device according to the present embodiment, it is possible to horizontally and/or vertically offset the center positions of the respective high-frequency transmitting units 152 (communication antennas) disposed around each connecting unit 102 from the center positions in the connecting units 102, even in the case of three or more connecting units 102.

In addition, in the power supply device according to the present embodiment, the center position of the high-frequency transmitting unit 152 (communication antenna) disposed around the connecting unit 102 may be horizontally and/or vertically offset from the center position in the connecting unit 102, even in the case of one connecting unit 102, as with a simplex outlet.

If the coupling factor becomes too large due to a physical overlap between the high-frequency transmitting unit 152 (communication antenna) and a communication antenna (discussed later) provided in a wireless communication unit 204 provided in an external power recipient device connected to the connecting unit 102, for example, distortion in the contactless communication waveform may occur because of a shift in the resonance point, for example. As a result, communication malfunction is a possibility.

Thus, in the power supply device according to the present embodiment, the center position of the high-frequency transmitting unit 152 (communication antenna) disposed around the connecting unit 102 is offset from the center position in the connecting unit 102, as illustrated by B in FIG. 5, for example. By offsetting the center position of the high-frequency transmitting unit 152 disposed around the connecting unit 102 from the center position in the connecting unit 102 as above, it is possible to offset overlapping antenna edges and faces between the antenna of the high-frequency transmitting unit 152 and the communication antenna (discussed later) provided in the wireless communication unit 204 provided in an external power recipient device connected to the connecting unit 102. For this reason, it is possible to keep the coupling factor from becoming extremely high.

Consequently, by offsetting the center position of the high-frequency transmitting unit 152 (communication antennas) disposed around the connecting unit 102 from the center position in the connecting unit 102 as illustrated by B in FIG. 5, for example, the power supply device according to the present embodiment is able to prevent communication malfunction from occurring. Note that the above advantage enabling the prevention of communication malfunction is also exhibited in the offsetting in the case where multiple connecting units 102 exist as illustrated by A in FIG. 5, for example.

However, the layout method for the coil L provided in the high-frequency transmitting unit 152 is not limited to the examples illustrated in FIGS. 4 and 5. For example, the coil L1 provided in the high-frequency transmitting unit 152 may have an arbitrary layout corresponding to the communication distance (a layout that matches RF communication properties corresponding to the communication distance). One example of the above communication distance is a communication distance approximately covering contact between a terminal connected to a power line of a connecting unit in the power supply device according to the present embodiment, and a plug member of an external power recipient device (a plug that connects to a power line), for example. By providing a layout corresponding to the communication distance as above, it is possible to raise the probability of the power supply device according to the present embodiment wirelessly communicating with an external power recipient device while in a state where the connecting unit 102 provided in the power supply device according to the present embodiment is connected to the external power recipient device by a power line, for example. Obviously, however, the communication distance between the power supply device and the external power recipient device according to the present embodiment is not limited to the examples illustrated above.

For example, the demodulating unit 154 demodulates the response signal from the connected external device by performing envelope detection on a change in amplitude of a voltage in an antenna terminal of the high-frequency transmitting unit 152 and binarizing the detected signal. The demodulating device of the response signal in the demodulating unit 154 is not limited to the above example, and, for example, the demodulating unit 154 can demodulate the response signal using a change in a phase of a voltage in the antenna terminal of the high-frequency transmitting unit 152.

Further, the demodulating unit 154 transfers the demodulated response signal to the control unit 106. Then, when the demodulated response signal is transmitted to the control unit 106, for example, the control unit 106 performs a variety of processing, such as processing data corresponding to the response signal 26 and generating the high-frequency signal generation command based on the processing result.

For example, through the configuration illustrated in FIG. 4, the wireless communication unit 104 transmits the carrier wave, and demodulates the response signal transmitted from the external connection device such as the power receiving device 200A. Of course, the configuration of the wireless communication unit 104 according to the present embodiment is not limited to the configuration illustrated in FIG. 4.

1-2. Wireless Communication Unit 204 Arranged in Power Receiving Device According to Present Embodiment The wireless communication unit 204 includes a communication antenna 250 and an IC chip 252. For example, the structural elements of the wireless communication unit 204 are connected to each other via a bus 272 serving as a data transmission path.

The communication antenna 250 receives the carrier wave transmitted from an external device such as the power supply device 100A, and transmits the response signal based on a processing result of processing in the IC chip 252.

For example, the communication antenna 250 includes a resonance circuit including a coil (inductor) L2 having a predetermined inductance and a capacitor C1 having a predetermined capacitance, and generates an inductive voltage by electromagnetic induction upon receiving the carrier wave. Then, the communication antenna 250 outputs a reception voltage resonating with the inductive voltage at a predetermined resonance frequency. Here, for example, the resonance frequency in the communication antenna 250 is set according to the frequency of the carrier wave such as 13.56 MHz. Through the above-described configuration, the communication antenna 250 receives the carrier wave, and transmits the response signal by load modulation performed in a load modulating unit 264 (which will be described later) arranged in the IC chip 252.

The IC chip 252 demodulates and processes the high-frequency signal based on the received carrier wave, and transmits the response signal through the communication antenna 250 by the load modulation. In other words, the IC chip 252 functions substantially as a wireless communication unit that actively performs wireless communication in the wireless communication unit 204.

For example, the IC chip 252 includes a carrier detecting unit 254, a detecting unit 256, a regulator 258, a demodulating unit 260, a data processing unit 262, a load modulating unit 264, Read Only Memory (ROM) 266, Random Access Memory (RAM) 268, and internal memory 270. The data processing unit 262, the ROM 266, the RAM 268, and the internal memory 270 are connected to one another, for example, via the bus 272 serving as a data transmission path. Although not shown in FIG. 3, for example, the IC chip 252 may further include a protection circuit (not shown) for preventing an overvoltage or an overcurrent from being applied to the data processing unit 262. Here, for example, a clamp circuit including a diode and the like may be used as the protection circuit (not shown).

The carrier detecting unit 254 generates a square wave detection signal based on the reception voltage transferred from the communication antenna 250, and transfers the detection signal to the data processing unit 262. For example, the data processing unit 262 uses the transferred detection signal as a processing clock for data processing. Here, the detection signal is based on the reception voltage transferred from the communication antenna 250 and thus synchronized with the frequency of the carrier wave transmitted from the external connection device. Thus, the IC chip 252 includes the carrier detecting unit 254 and thus can perform processing with an external device such as the power supply device 100A in synchronization with this external device.

The detecting unit 256 rectifies the reception voltage output from the communication antenna 250. Here, for example, the detecting unit 256 includes a diode D1 and a capacitor C2.

The regulator 258 converts the reception voltage into a constant voltage through smoothing, and outputs a driving voltage to the data processing unit 262. Here, for example, the regulator 258 uses the DC component of the reception voltage as the driving voltage.

The demodulating unit 260 demodulates the high-frequency signal based on the reception voltage, and outputs data (for example, a binary data signal having a high level and a low level) corresponding to the high-frequency signal included in the carrier wave. Here, for example, the demodulating unit 260 outputs an AC component of the reception voltage as data.

For example, the data processing unit 262 is driven using the driving voltage output from the regulator 258 as a power source, and processes data demodulated in the demodulating unit 260. Here, for example, the data processing unit 262 includes an MPU, various processing circuits, or the like.

Further, the data processing unit 262 selectively generates a control signal used to control the load modulation related to the response to the external connection device according to the processing result. Then, the data processing unit 262 selectively outputs the control signal to the load modulating unit 264.

Further, for example, the data processing unit 262 reads data stored in the internal memory 270 based on a command included in the data demodulated in the demodulating unit 260 and updates the read data.

For example, the load modulating unit 264 includes a load Z and a switch SW1, and performs the load modulation by selectively connecting (enabling) the load Z in response to the control signal transferred from the data processing unit 262. Here, for example, the load Z includes a resistor having a predetermined resistance value, but the load Z is not limited to this example. For example, the switch SW1 includes a p-channel type Metal Oxide Semiconductor Field Effect Transistor (MOSFET) or an n-channel type MOSFET, but the switch SW1 is not limited to this example.

The ROM 266 stores a program and control data such as a calculation parameter, which are used by the data processing unit 262. The RAM 268 temporarily stores a program executed by the data processing unit 262, a calculation result, an execution state, and the like.

The internal memory 270 is a storage unit arranged in the IC chip 252. For example, the internal memory 270 is tamper-resistant, and performs reading of data, new writing of data, updating of data, or the like through the data processing unit 262. For example, the internal memory 270 stores a variety of data such as identification information, receiving capability information, an electronic value, and an application. In other words, the internal memory 270 fulfills the role of a storage unit that stores information related to power receiving capability in the power receiving device 200A (an example of the external power recipient device according to the present embodiment). Here, FIG. 4 illustrates the example in which the internal memory 270 stores identification information 274 and an electronic value 276, but data stored in the internal memory 270 is not limited to this example.

For example, through the above-described configuration illustrated in FIG. 3, the IC chip 252 processes the high-frequency signal received through the communication antenna 250, and transmits the response signal from the communication antenna 250 through the load modulation.

For example, the wireless communication unit 204 includes the communication antenna 250 and the IC chip 252, and thus processes the high-frequency signal transmitted from the external device such as the power supply 26 device 100A and transmits the response signal through the load modulation. Further, the configuration of the wireless communication unit 204 according to the present embodiment is not limited to the configuration illustrated in FIG. 3. For example, in the wireless communication unit 204, the structural elements configuring the IC chip 252 illustrated in FIG. 3 may not be configured in the form of an IC chip.

For example, when the wireless communication unit 104 illustrated in FIG. 3 is arranged in the power supply device according to the present embodiment, and the wireless communication unit 204 illustrated in FIG. 3 is arranged in the external power recipient device such as the power receiving device according to the present embodiment, the power supply device according to the present embodiment and the power receiving device according to the present embodiment can perform wireless communication using a wireless communication technology such as a communication technology based on NFC.

Here, by performing wireless communication by wireless communication technology such as a communication technology based on NFC or RFID technology, the external power recipient device such as the power receiving device according to the present embodiment can be driven by power obtained from the received high-frequency signal and can transmit stored information by performing the load modulation. In other words, in a communication system having the external power recipient device such as the power supply device according to the present embodiment and the power receiving device according to the present embodiment, the external power recipient device such as the power receiving device according to the present embodiment can perform wireless communication even when a separate power supply circuit to perform communication is not arranged. Further, for example, the external power recipient device such as the power receiving device according to the present embodiment can transmit stored information by performing the load modulation even when a signal (a signal representing the user's instruction) according to the user's operation is not input.

Also, by conducting wireless communication by wireless communication technology such as a communication technology based on NFC or RFID technology, a signal is not impressed upon a modulated carrier wave over a power line as in the case of using a power line communication technology such as PLC, and in addition, the communication path becomes physically separate from the power line. Consequently, conducting wireless communication by wireless communication technology such as a communication technology based on NFC or RFID technology may prevent malfunction or damage in the power receiving device according to the present embodiment or an external power recipient device such as existing equipment.

(Power Supply Device According to the Present Embodiment)

Next, an exemplary configuration of a power supply device according to the present embodiment which is able to conduct a process in accordance with a power supply method according to the present embodiment as discussed above will be described.

Figure 6:
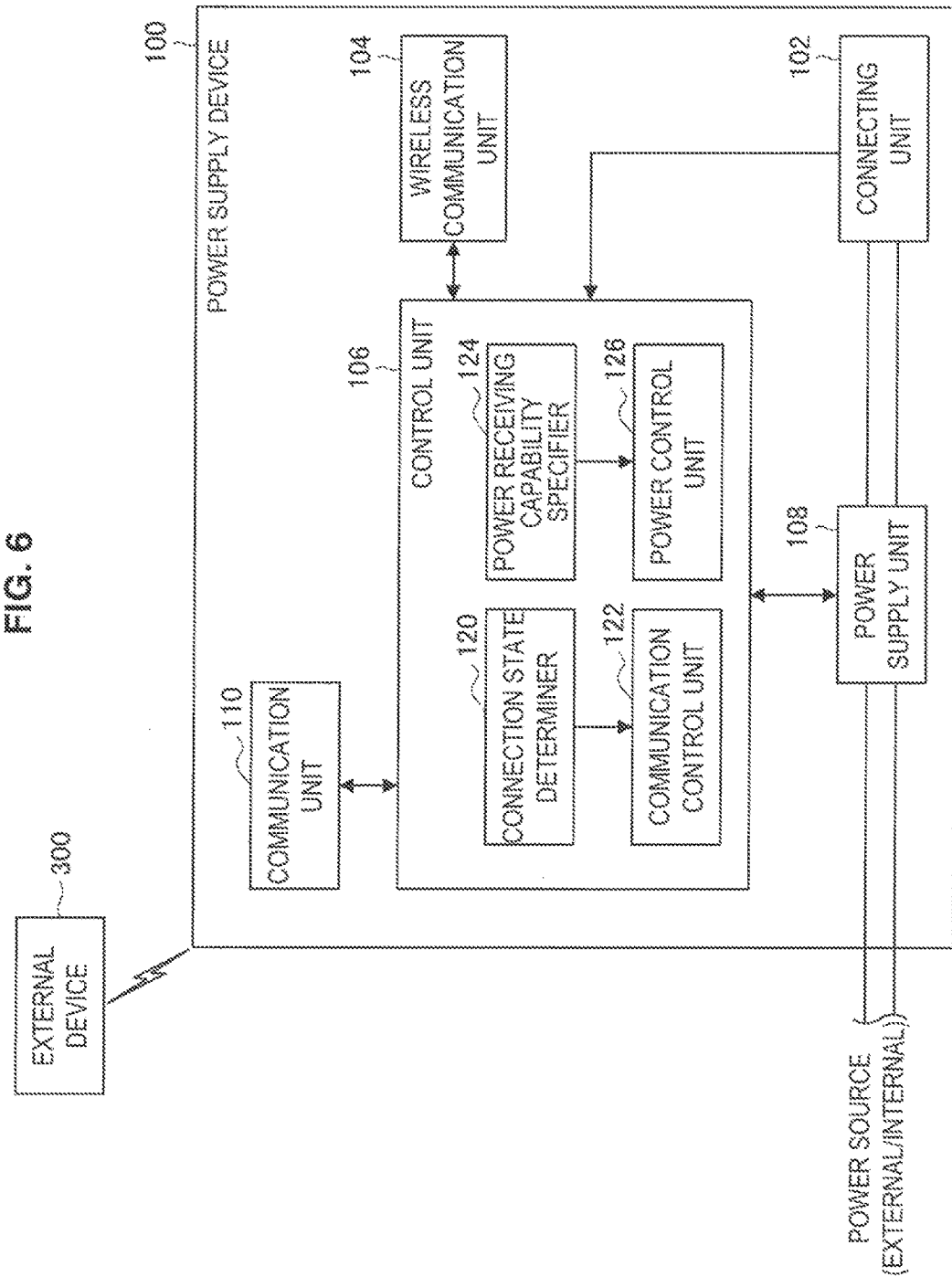
FIG. 6 is an explanatory diagram illustrating an exemplary configuration of a power supply device according to the present embodiment.

FIG. 6 illustrates an exemplary configuration of a power supply device 100 according to the present embodiment. Herein, an external device 300 able to communicate with the power supply device 100 in a wired or wireless manner is additionally illustrated in FIG. 6.

The external device 300 herein may, for example, be a server that manages one or multiple power supply devices according to the present embodiment and controls the overall power system in a home or building (such as a gateway server, for example), a metering device that collects logs by receiving log data transmitted from one or multiple power supply devices according to the present embodiment (log data indicating electric power measurement results and status information, for example), or a server external to the power system (such as a server at a power company or a local management facility, for example). Note that in the case where the external device 300 is a server that controls the overall power system in a home or building, the external device 300 may also perform processes related to the control of the power system in conjunction with an external server by communicating with the external server in a wired or wireless manner. Potential examples of such processes related to the control of the power system in the external device 300 include processes related to energy management based on factors such as the level of power demand, electric rates, and power-generating status. In addition, the external device 300 is not limited to a single device, and may also be a device group made up of multiple devices (a server group, for example).

The power supply device 100, for example, includes a connecting unit 102, a wireless communication unit 104, a control unit 106, a power supply unit 108, and a communication unit 110.

The power supply device 100 may further include, for example, ROM (not shown), RAM (not shown), a storage unit (not shown), and a display unit (not shown). For example, the structural elements with of the power supply device 100 are connected with one another via a bus serving as a data transmission path.

The storage unit (not shown) is a storing device that the power supply device 100 includes, and stores a variety of data including identification information acquired from the external power recipient device, information related to the power receiving capability such as the power receiving information, an application, and the like. Here, a magnetic recording medium such as a hard disk or non-volatile memory such as Electrically Erasable and Programmable Read Only Memory (EEPROM), flash memory, Magnetoresistive Random Access Memory (MRAM), Ferroelectric Random Access Memory (FeRAM), and Phase change Random Access Memory (PRAM) may be used as the storage unit (not shown). Further, the storage unit (not shown) may be removably mounted in the power supply device 100.

The display unit (not shown) is a display device arranged in the power supply device 100, and displays various pieces of information (for example, an image, text, and/or the like) on a display screen. For example, a notification screen notifying the user of the power source status or external power conditions obtained from the external device 300 or elsewhere (such as electric rates, power types, and power demand, for example), or an operation screen through which a desired operation is performed on the power supply device 100 may be displayed on the display screen of the display unit (not shown).

Here, a display device such as a Liquid Crystal Display (LCD) or an organic EL display (an Organic Electro-Luminescence display device or an Organic Light Emitting Diode display) may be used as the display unit (not shown). For example, in the power supply device 100, the display unit (not shown) may include a touch screen. In this case, the display unit (not shown) can function as an operation display unit in which both the user operation and a display can be performed.

In addition, the power supply device 100 can perform communication with an external terminal via a network (or directly) regardless of the installation the display unit (not shown) and cause a notification screen or the operation screen to be displayed on a display screen of the external terminal. For example, when the external terminal is an external terminal (for example, a portable communication device or a remote control) possessed by the user of the power supply device 100, the user can operate his/her external terminal and cause the power supply device 100 to perform desired processing, and can check information transmitted from the power supply device 100 using the external terminal. Thus, in this case, for example, when the power supply device 100 is installed below a desk and it is not easy for the user to directly operate the power supply device 100 or to see information displayed on the display unit (not shown), the user's convenience can be improved.

The connecting unit 102 connects an external device to a power line on which electric power is transmitted.

At this point, since the power supply device according to the present embodiment causes power compatible with the external power recipient device to be transmitted by the above process (4) (the power control process), it is possible for the power supply device according to the present embodiment to, for example, convert an AC power source and cause DC power to be transmitted to the external power recipient device, as discussed earlier. In addition, since the power supply device according to the present embodiment is also able to cause electric power supplied from a power source to be transmitted to an external power recipient device without conversion, as illustrated in FIG. 1, for example, the power supply device according to the present embodiment is also able to cause electric power to be transmitted to devices (such as existing electronic equipment, for example) compatible with existing AC power sources such as an electric utility.

However, there is a possibility that an external power recipient device according to the present embodiment may cause damage or other problems in the case where an external power recipient device according to the present embodiment, such as a power receiving device according to the present embodiment that operates on DC power, is connected to an existing power outlet that outputs electric power based on an electric utility.

Thus, in the present embodiment, the external power recipient device according to the present embodiment may be provided with a structure that restricts connection to existing power outlets, for example. More specifically, the external power recipient device according to the present embodiment may be equipped with a connecting unit that connects to a power line, for example, with the connecting unit including a power line connecting plug for connecting to a power line (power line connecting plug member), and a plug (plug member) that restricts the insertion of the power line connecting plug into an external insertion slot that accepts the insertion of the power line connecting plug (this corresponds to the insertion slots for a power line connecting plug in an existing power outlet, for example). By equipping the external power recipient device according to the present embodiment with a connecting unit as above, the external power recipient device according to the present embodiment is able to restrict connection to an existing power outlet that outputs electric power based on an electric utility, and prevent problems such as damage to the external power recipient device according to the present embodiment.

As above, the external power recipient device according to the present embodiment may be equipped with a connecting unit having a structure that restricts connection to an existing power outlet, for example. The connecting unit 102 provided in the power supply device 100 according to the present embodiment has a structure corresponding to the connecting unit provided in the external power recipient device according to the present embodiment in order to transmit electric power compatible with the external power recipient device according to the present embodiment, even in the case where the external power recipient device according to the present embodiment is equipped with a connecting unit having a structure that restricts connection to an existing power outlet.

More specifically, the connecting unit 102 may be equipped with one or multiple first insertion slots that accept the insertion of a power line connecting plug for connecting to a power line, and one or multiple second insertion slots that accept the insertion of a plug shaped differently than the power line connecting plug, for example.

Figure 7:
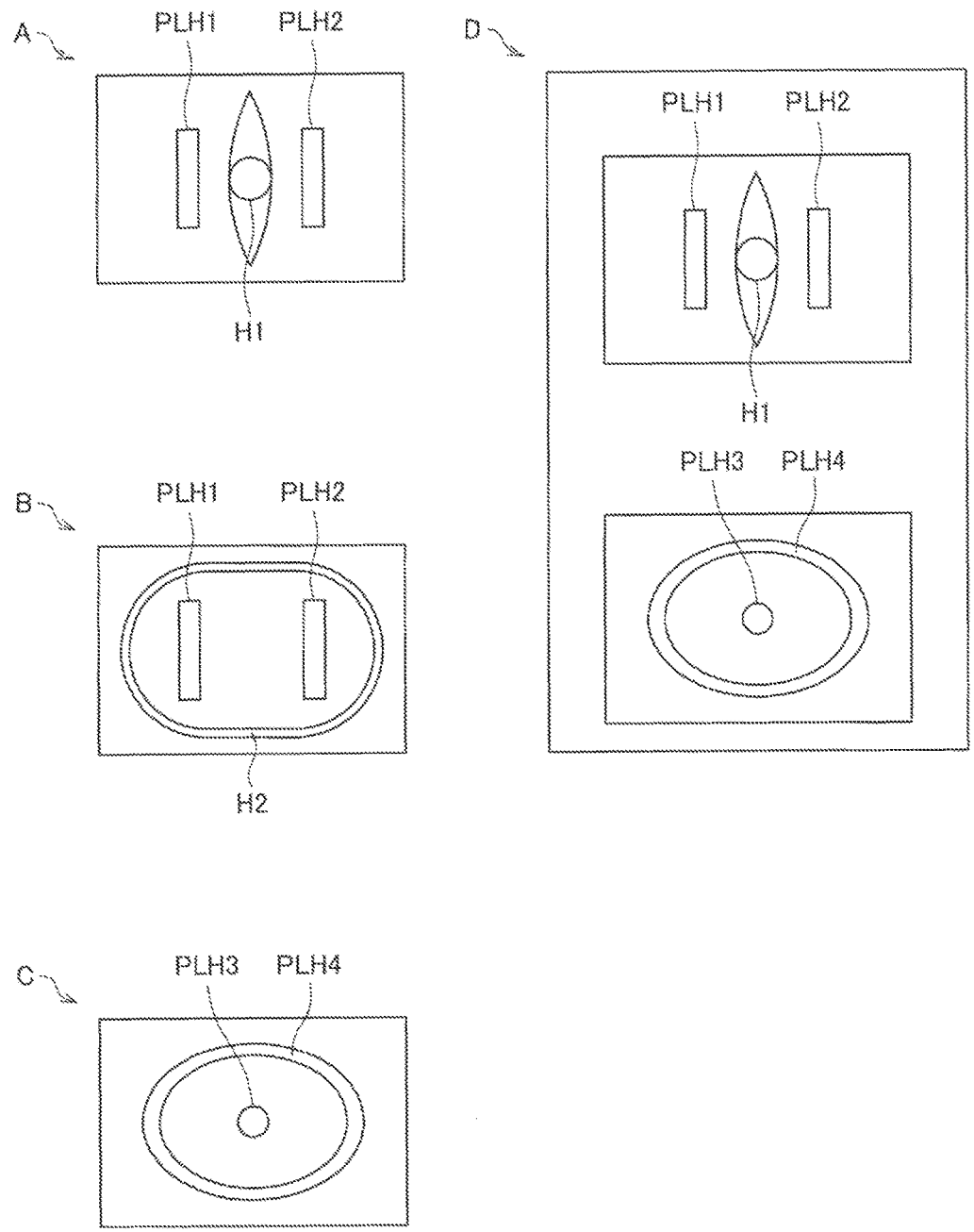
FIG. 7 is an explanatory diagram illustrating exemplary structures of a connecting unit provided in a power supply device according to the present embodiment.

FIG. 7 is an explanatory diagram illustrating exemplary structures of the connecting unit 102 provided in the power supply device according to the present embodiment. The portions labeled A to D in FIG. 7 respectively illustrate examples of structures for the connecting unit 102. Herein, PLH1 to PLH4 illustrated in FIG. 7 respectively illustrate examples of first insertion slots, while H1 and H2 illustrated in FIG. 7 respectively illustrate examples of second insertion slots.

As illustrated by A in FIG. 7, the connecting unit 102 may be equipped with first insertion slots PLH1 and PLH2 that accept the insertion of a power line connecting plug, and a second insertion slot H1 that accepts the insertion of a plug 26 shaped differently than the power line connecting plug, for example. Also, as illustrated by the first insertion slots PLH3 and PLH4 in C of FIG. 7, the shapes of the first insertion slots in the connecting unit 102 are not limited to the shapes indicated by the first insertion slots PLH1 and PLH2 in A of FIG. 7. Also, as illustrated by the second insertion slot H2 in B of FIG. 7, the shape of the second insertion slot in the connecting unit 102 is not limited to the shape indicated by the second insertion slot H1 in A of FIG. 7. Additionally, as illustrated by D in FIG. 7, the connecting unit 102 may also be configured to allow connections to multiple external power recipient devices.

By having a structure corresponding to the connecting unit provided in the external power recipient device according to the present embodiment as illustrated in FIG. 7, for example, the connecting unit 102 is able to connect the external power recipient device according to the present embodiment to a power line, even in the case where the external power recipient device according to the present embodiment is equipped with a connecting unit having a structure that restricts connection to existing power outlets. However, the structure of the connecting unit 102 provided in the power supply device according to the present embodiment is not limited to the structures illustrated in FIG. 7. For example, it is also possible for the power supply device according to the present embodiment to not include a second insertion slot, as illustrated by D in FIG. 7.

Returning once again to FIG. 6, an exemplary configuration of the power supply device according to the present embodiment will now be described. The control unit 106 may be realized with an MPU or various processing circuits, for example, and fulfills the role of controlling the power supply device 100 overall. In addition, the control unit 106 may be equipped with a connection state determiner 120, a communication control unit 122, a power receiving capability determiner 124, and a power control unit 126, and fulfill the leading role of conducting a process related to a power supply method according to the present embodiment.

The connection state determiner 120 fulfills the leading role of conducting the above process (1) (the connection state determining process), and determines the connection state between the external power recipient device and the power line. More specifically, the connection state determiner 120 may determine the connection state at the connecting unit 102 on the basis of a detection signal transmitted from the connecting unit 102, for example.

The communication control unit 122 fulfills the leading role of conducting the above process (2) (the communication control process), and causes information related to the power receiving capability corresponding to the external power recipient device to be acquired by wireless communication in the case where the connection state determiner 120 determines that the external power recipient device is connected to the power line. More specifically, the communication control unit 122 may cause the wireless communication unit 104 to transmit a transmission request containing a transmission command causing information related to power receiving capability to be transmitted, for example. The wireless communication unit 104 then receives information related to power receiving capability transmitted in response to the transmission request, and thus the power supply device 100 acquires information related to power receiving capability corresponding to the external power recipient device.

The communication control unit 122 may also control communication with an external device such as the external device 300 via the communication unit 110, for example.

The power receiving capability determiner 124 fulfills the leading role of conducting the above process (3) (the power receiving capability specifying process), and specifies the power receiving capability of the external power recipient device on the basis of the information related to power receiving capability acquired wireless communication under control by the communication control unit 122. More specifically, the power receiving capability determiner 124 may specify the power receiving capability of the external power recipient device on the basis of power receiving capability information (an example of information related to power receiving capability) or identification information (an example of information related to power receiving capability) acquired from the external power recipient device by communication with the external power recipient device, for example.

The power control unit 126 fulfills the leading role of conducting the above process (4) (the power control process), and causes compatible power to be transmitted to the external power recipient device on the basis of the power receiving capability specified by the power receiving capability determiner 124 (the regular process). More specifically, the power control unit 126 causes compatible power to be transmitted to the external power recipient device by transmitting a control signal based on the power receiving capability specified by the power receiving capability determiner 124 to the power supply unit 108, for example. Potential examples of the above control signal at this point include a signal setting parameters such as the voltage, frequency, and maximum current of the electric power output from the power supply unit 108, and a signal that controls the output from the power supply unit 108 on or off.

Further, for example, the power control unit 126 determines whether or not it is possible for the power supply unit 108 to transmit compatible electric power to the external power recipient device. For example, when it is difficult for the power supply unit 108 to perform conversion to electric power compatible with the external power recipient device, the power control unit 126 determines that it is difficult for the power supply unit 108 to transmit electric power compatible with the external power recipient device. Then, when it is determined that it is difficult to cause compatible electric power to be supplied to the external power recipient device, the power control unit 126 does not transmit electric power to the external power recipient device (the exceptional process). Here, for example, the power control unit 126 does not cause electric power to be transmitted to the external power recipient device by transferring a control signal to the power supply unit 108.

The power control unit 126 may also manage the state of electric power transmitted to the external power recipient device (such as current draw and voltage state, for example) and the state of the power supply unit 108 (such as temperature and damage, for example) on the basis of a signal issued from the power supply unit 108, for example. Also, in the case of managing the state of electric power above, it is also possible for the power control unit 126 to adjust the electric power compatible with the external power recipient device by issuing a control signal to the power supply unit 108 as appropriate on the basis of a signal issued from the power supply unit 108. In addition, in the case of managing the state of electric power above, the power control unit 126 may also cause data indicating the state of the electric power to be transmitted to the external device 300 or elsewhere via the communication unit 110.

The power control unit 126 may also control the power supply unit 108 on the basis of receive data received by the communication unit 110 from the external device 300 or elsewhere. Potential examples of the above receive data include data containing a control command that controls power source output, and data indicating the power source type (such as data indicating the type of electric power supplied to the home from an electric company, for example).

The following are examples of adjusting the electric power compatible with the external power recipient device and controlling the power supply unit 108 from the power control unit 126.

In the case where measurement data regarding the electric power being managed has exceeded a maximum current draw indicated by information related to power receiving capability, the power control unit 126 issues to the power supply unit 108 a control signal that stops output or a control signal that locks the current and lowers the voltage.

In the case where measurement data regarding the electric power being managed has not exceeded a maximum current draw indicated by information related to power receiving capability, but is exceeding a maximum current draw set by the external device 300 or the like, the power control unit 126 issues to the power supply unit 108 a control signal that stops output or a control signal that locks the current and lowers the voltage.

The power control unit 126 may also cause the power supply unit 108 to not transmit power in the case where a detection signal issued from the connecting unit 102 indicates that the external power recipient device is not connected, or in the case where an operation signal based on a user operation or receive data received from the external device 300 or elsewhere indicates that output is to be stopped, for example. The power control unit 126 stops the output of electric power from the power supply unit 108 by issuing a control signal for stopping output to the power supply unit 108, for example.

By being equipped with, for example, the connection state determiner 120, the communication control unit 122, the power receiving capability determiner 124, and the power control unit 126, the control unit 106 leads in conducting a process related to a power supply method according to the present embodiment.

However, the configuration of the control unit provided in the power supply device according to the present embodiment is not limited to the configuration illustrated in FIG. 6. For example, a control unit according to the present embodiment may be additionally equipped with an authenticator that conducts the authentication process discussed earlier. If an authenticator is provided, the power receiving capability determiner 124 selectively conducts the above process (3) (the power receiving capability specifying process) on the basis of the authentication results, in the case where authentication is completed correctly, for example. In addition, if an authenticator is provided, the power control unit 126 selectively causes electric power to be transmitted to the external power recipient device on the basis of the authentication results, in the case where authentication is completed correctly, for example.

Additionally, it is also possible to individually provide one or more of the connection state determiner 120, the communication control unit 122, the power receiving capability determiner 124, the power control unit 126, and the authenticator (if an authenticator is provided) in the power supply device according to the present embodiment (by realizing the respective units with individual processing circuits, for example).

For example, the power supply unit 108 selectively connects a power source (for example, an internal power source or one or more external power sources) with the power line PL based on a control signal transferred from the control unit 106 (more technically, the power control unit 126), and selectively supplies electric power to the power line PL. Further, for example, the power supply unit 108 selectively converts electric power supplied from a power source based on the control signal transferred from the control unit 106 (more technically, the power control unit 126), and supplies the selectively converted electric power to the power line PL.

Here, for example, a switch that is turned on or off based on a control signal transferred from the control unit 106 or a circuit configured with various kinds of converter circuits such as an alternating current to direct current (AC-DC) converter, an alternating current to alternating current (AC-AC) converter, or an inverter may be used as the power supply unit 108. For example, the switch is configured with a p-channel type MOSFET or an n-channel type MOSFET, but a configuration of the switch is not limited to this example. Further, the power supply unit 108 may have a digital power source.

The power supply unit 108 may also include functionality for measuring output electric power, and functionality for stopping output upon detecting overcurrent or detecting that a maximum current draw has been exceeded, for example. The above functionality for measuring output electric power may be realized by current measurement using a current transformer (CT), or by voltage measurement using an analog to digital (A/D) converter, for example.

However, the configuration of the power supply unit 108 is not limited to the above, and the power supply unit 108 may take an arbitrary configuration able to cause electric power compatible with an external power recipient device to be transmitted on the basis of a control signal issued from the control unit 106.

Figure 8:
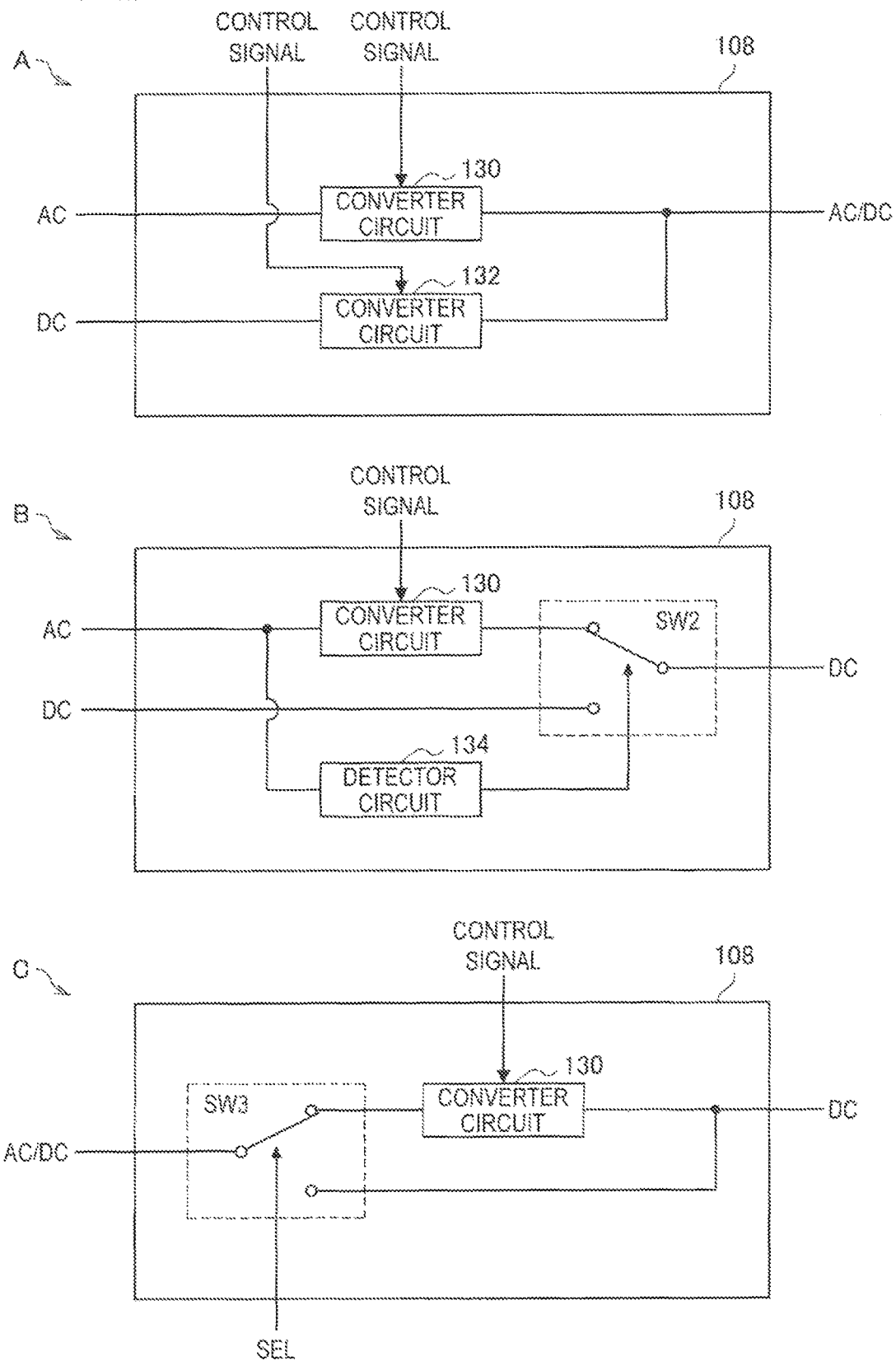
FIG. 8 is an explanatory diagram illustrating exemplary configurations of a power supply unit provided in a power supply device according to the present embodiment.

FIG. 8 is an explanatory diagram illustrating exemplary configurations of the power supply unit 108 provided in the power supply device 100 according to the present embodiment. The portions labeled A to C in FIG. 8 respectively illustrate examples of configurations for the power supply unit 108. FIG. 8 also illustrates exemplary configurations of the power supply unit 108 in the case where the power supply unit 108 may be supplied with an AC power source (labeled "AC" in FIG. 8) and a DC power source (labeled "DC" in FIG. 8).

For example, in the case where either an AC power source or a DC power source is selectively from an electric switchboard or the like, the power supply unit 108 is equipped with a converter circuit 130 on the line supplying the AC power source, and is equipped with a converter circuit 132 on the line supplying the DC power source, as illustrated by A in FIG. 8, for example. The converter circuit 130 herein is a circuit that selectively converts an AC power source on the basis of a control signal. The converter circuit 130 includes components such as a relay switch that switches on/off on the basis of the control signal, one or more AC/DC converters, one or more AC/AC converters, and an inverter, for example. Meanwhile, the converter circuit 132 is a circuit that selectively converts a DC power source on the basis of a control signal. The converter circuit 132 includes components such as a relay switch that switches on/off on the basis of the control signal, one or more DC/AC converters, one or more DC/DC converters, and an inverter, for example.

The power supply unit 108 may also be equipped with the converter circuit 130, a detector circuit 134, and a switch SW2, as illustrated by B in FIG. 8, for example. The switch SW2 switches between the line supplying an AC power source and the line supplying a DC power source according to an output signal issued from the detector circuit 134. More specifically, the switch SW2 connects to the line supplying an AC power source in the case where the signal level of the signal issued from the detector circuit 134 is a signal level indicating the supply of an AC power source, for example. On the other hand, the switch SW2 connects to the line supplying a DC power source in the case where the signal level of the signal issued from the detector circuit 134 is not a signal level indicating the supply of an AC power source, for example. The above switch SW2 may be a relay switch, a p-channel MOSFET, or an n-channel MOSFET, for example.

The power supply unit 108 may also take a configuration that switches between the line supplying an AC power source and the line supplying a DC power source on the basis of a select signal SEL issued from an electric switchboard or an external device such as a gateway server, as illustrated by C in FIG. 8, for example. In the case of taking a configuration that switches between the line supplying an AC power source and the line supplying a DC power source on the basis of a select signal SEL issued from an external device, the power supply unit 108 may be equipped with a switch SW3 and the converter circuit 130, as illustrated by C in FIG. 8, for example. The switch SW3 switches between the line supplying an AC power source and the line supplying a DC power source according to the select signal SEL issued from an external device. More specifically, the switch SW3 connects to the line supplying an AC power source in the case where the signal level of the select signal SEL is a signal level indicating the supply of an AC power source, for example. On the other hand, the switch SW3 connects to the line supplying a DC power source in the case where the signal level of the select signal SEL is not a signal level indicating the supply of an AC power source, for example. The above switch SW3 may be a relay switch, a p-channel MOSFET, or an n-channel MOSFET, for example.

The power supply unit 108 includes one of the configurations illustrated in FIG. 8, for example. However, the configuration of the power supply unit 108 according to the present embodiment is not limited to the configurations illustrated in FIG. 8. For example, the power supply unit 108 may also be equipped with a converter circuit such as a direct current to direct current (DC/DC) converter, an inverter, or a relay switch on the line supplying a DC power source.

Also, although FIG. 8 illustrates the power supply unit 108 as having one output, the configuration of the power supply unit 108 according to the present embodiment is not limited to having one output. For example, the power supply unit 108 may also have multiple outputs. In the case of multiple outputs, the power supply unit 108 selectively converts electric power supplied from a power source for each output path and outputs the selectively converted electric power on each output path, on the basis of a control signal issued from the control unit 106 (more specifically, the power control unit 126).

Returning once again to FIG. 6, an exemplary configuration of the power supply device according to the present embodiment will now be described. The communication unit 110 provided in the power supply device 100 communicates with an external device 300 such as a server in a wired or wireless manner via a network (or directly). In addition, communication in the communication unit 110 is controlled by, for example, the control unit 106 (the communication control unit 122, for example). By providing the communication unit 110, the power supply device 100 becomes able to conducts processes in conjunction with the external device 300 (such as the above process (3) (the power receiving capability specifying process) or an authentication process, for example). Furthermore, by providing the communication unit 110 and communicating with a server or gateway included in part of a home energy management system (HEMS), the power supply device 100 is able to be included in a HEMS together with the server or the like.

Here, for example, a communication antenna and a radio frequency (RF) circuit (wireless communication), an IEEE 802.15.1 port and a transceiving circuit (wireless communication), an IEEE 802.11b port and a transceiving circuit (wireless communication), or a local area network (LAN) terminal and a transceiving circuit (wired communication) may be used as the communication unit 110. Further, the communication unit 110 may have a configuration conforming to an arbitrary communication standard such as a universal serial bus (USB) terminal and a transceiving circuit, ZigBee, or SubG, or a configuration capable of performing communication with an external device via a network. Examples of the network according to the present embodiment include a wired network such as a LAN, a wide area network (WAN), or a network performing communication via the power line by PLC, a wireless network such as a wireless LAN (WLAN) or a wireless WAN (WWAN) via a base station, and the Internet using a communication protocol such as a transmission control protocol/Internet protocol (TCP/IP).

However, the configuration of the communication unit 110 is not limited to the above. For example, in cases such as where the power supply device according to the present embodiment is a power outlet installed in a building as illustrated in FIG. 4, it may be difficult to equip the power supply device according to the present embodiment with a full communication device for space reasons. Thus, the communication unit 110 according to the present embodiment may be equipped with part of the structural elements of a communication device, such as a chip antenna and a connector that connects to a signal line, for example, and may communicate with a server or other external device 300 in a wired or wireless manner in conjunction with the remaining structural elements of a communication device which are provided externally.

Figure 9:
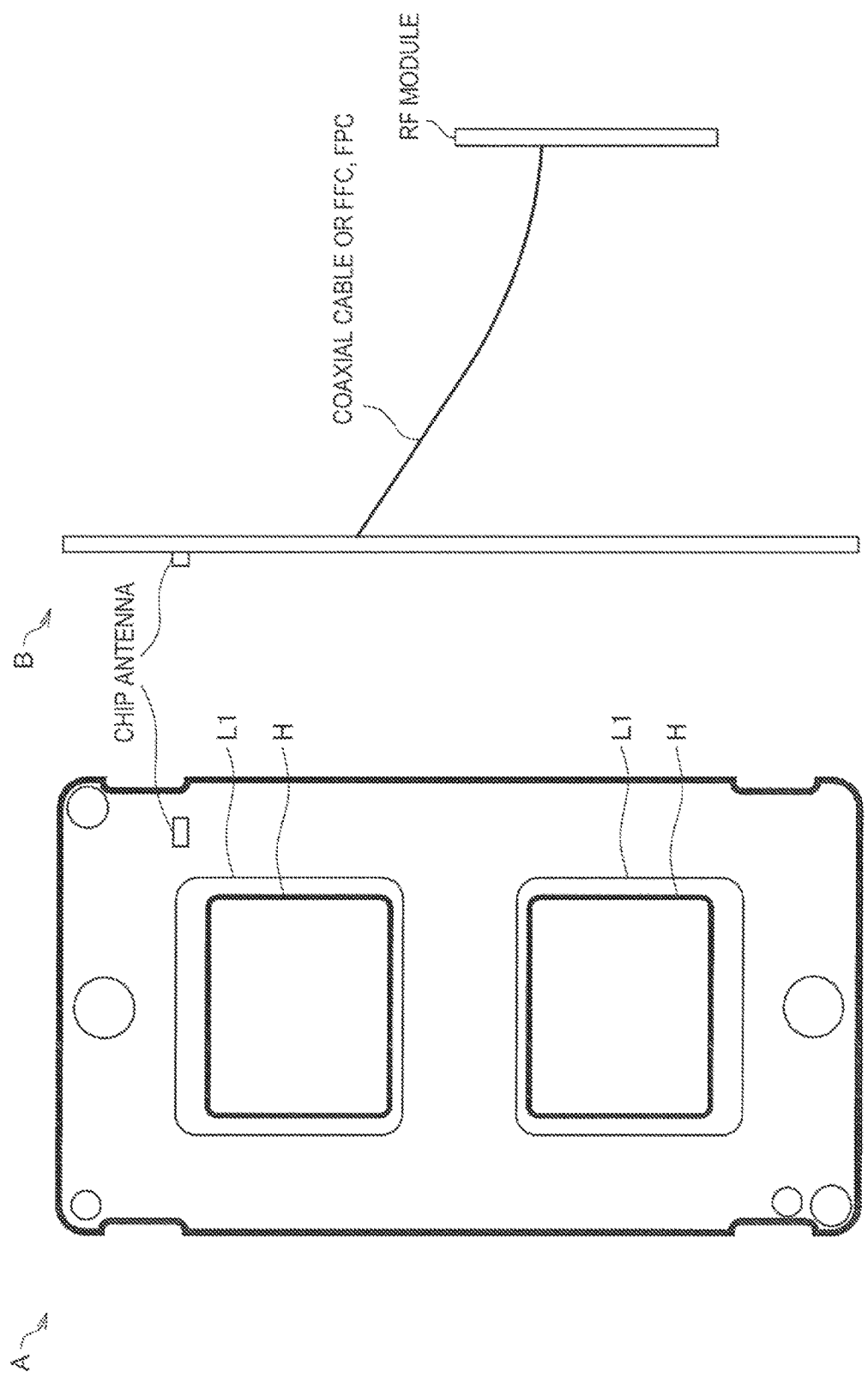
FIG. 9 is an explanatory diagram for illustrating an example of a communication unit provided in a power supply device according to the present embodiment.

FIG. 9 is an explanatory diagram for illustrating an example of the communication unit 110 provided in the power supply device 100 according to the present embodiment. FIG. 9 herein illustrates the case where the power supply device according to the present embodiment is a power outlet installed in a building, similarly to FIG. 4. The portion labeled A in FIG. 9 illustrates a base plate provided with structural elements related to a power supply method according to the present embodiment, such as the wireless communication unit 104 and the control unit 106, similarly to FIG. 4. The portion labeled B in FIG. 9 illustrates a radio frequency (RF) module connected to the base plate illustrated by A in FIG. 9 by a signal line such as a coaxial cable or a flexible flat cable (FFC) or flat panel cable (FPC).

In the case where the power supply device according to the present embodiment is a power outlet installed in a building and it is difficult to equip the power supply device according to the present embodiment with a full communication device, it is conceivable to dispose a full communication device behind the wall where the power outlet is provided, for example. However, steel frameworks are used for many recent buildings, and light gauge steel is also being used for walls and roofing. In the case where a steel framework and light gauge steel are used in a building, radio waves may not reach a server or other external device if the antenna exists inside a wall.

Thus, the power supply device 100 according to the present embodiment is equipped with a communication unit 110 in the form of a chip antenna (an example of part of the structural elements of a communication device), as illustrated by A in FIG. 9, for example. More specifically, in the power supply device 100, a chip antenna and a connector (not illustrated) that connects to a signal line are mounted on the base plate illustrated by A in FIG. 9, for example. A coaxial or other cable is then used to connect the chip antenna to an RF module disposed behind the wall where the power outlet is provided (an example of the remaining structural elements of a communication device which are provided externally) as illustrated by B in FIG. 9, for example.

By providing part of the structural elements of a communication device, such as a chip antenna and a connector that connects to a signal line, and connecting these structural elements to the remaining structural elements of a communication device which are provided externally, as illustrated in FIG. 9, for example, it is possible to communicate with a server or other external device 300 in a wired or wireless manner in conjunction with the remaining structural elements of a communication device which are provided externally. Note that in the case of equipping the communication unit 110 according to the present embodiment with part of the structural elements of a communication device, the part of the structural elements of a communication device provided in the communication unit 110 according to the present embodiment is obviously not limited to the example illustrated in FIG. 9.

With the configuration illustrated in FIG. 6, for example, the power supply device 100 conducts processes related to a power supply method according to the present embodiment (such as the above process (1) (the connection state determining process) to the above process (4) (the power control process), for example). Consequently, with the configuration illustrated in FIG. 6, for example, the power supply device 100 is able to cause an external power recipient device to receive power compatible with the external power recipient device. In addition, with the configuration illustrated in FIG. 6, for example, the power supply device 100 is potentially able to improve user convenience.

Furthermore, by having a structure corresponding to the connecting unit provided in the external power recipient device according to the present embodiment as illustrated in FIG. 7, for example, the power supply device 100 is able to connect the external power recipient device according to the present embodiment to a power line, even in the case where the external power recipient device according to the present embodiment is equipped with a connecting unit having a structure that restricts connection to existing power outlets. Thus, by using the power supply device 100, it becomes possible for the connecting unit provided in the power supply device according to the present embodiment to have a uniform structure and shape, irrespective of the DC voltages supported by respective devices, for example. Consequently, by using the power supply device 100, it is possible to realize a safer and more versatile power system (a system including the power supply device according to the present embodiment, the power receiving device according to the present embodiment, and external power recipient devices such as existing electronic equipment, for example).

In addition, even in cases where the connecting unit 102 enables the transmission of electric power to each of multiple external power recipient devices, as illustrated by D in FIG. 7, for example, the power supply device 100 is still able to control the electric power transmitted on each output. Thus, even in cases where multiple external power recipient devices are connected to the connecting unit 102, the power supply device 100 is still able to cause the external power recipient devices to receive electric power that is respectively compatible with each of the external power recipient devices.

Furthermore, since the power supply device 100 is capable of controlling the electric power transmitted on each output, it is possible to set the output to 0 V (or in other words, earth) or to an insulating state when an external power recipient device is not connected to the connecting unit 102, and discharging is also possible. Consequently, the power supply device 100 is able to prevent electric shock.

Furthermore, since the power supply device 100 is capable of controlling the electric power transmitted on each output, it is not necessary to modify the shape of the connector in the connecting unit 102 for different power source specifications (such as DC voltage, for example). Consequently, by using the power supply device 100, it becomes possible to for example, make the connector portion (the shape of the connector portion of a power outlet, for example) have a uniform shape.

The configuration of the power supply device according to the present embodiment is not limited to the configuration illustrated in FIG. 6.

1. First Modified Example

For example, when the device (or circuit) having the function corresponding to the power supply unit 108 is not provided as an external device (or circuit) of the power supply device according to the present embodiment, the power supply device according to the present embodiment may not include the power supply unit 108. In this case, even when the power supply unit 108 is not provided, the power supply device according to the first modified example of the present embodiment can perform the process (1) (the connection state determining process) to the process (4) (the power control process) by controlling the device (or circuit) having a function corresponding to the power supply unit 108, for example, in the same way as control of the power supply unit 108. Thus, the power supply device according to the first modified example of the present embodiment can have the same effect as the power supply device 100 illustrated in FIG. 6.

2. Second Modified Example

The power supply device according to the present embodiment may also take a configuration that does not include the communication unit 110, for example. Even if the communication unit 110 is not provided, the power supply device according to the second modified example of the present embodiment is still able to conduct the above process (1) (the connection state determining process) to the above process (4) (the power control process), for example. Consequently, the power supply device according to the second modified example of the present embodiment is able to exhibit advantages similar to those of the power supply device 100 illustrated in FIG. 6.

3. Third Modified Example

Furthermore, the power supply device according to the present embodiment may also not be equipped with the connecting unit 102 in cases such as where a device including functionality equivalent to the connecting unit 102 is present as an external device to the power supply device according to the present embodiment. Even if the connecting unit 102 is not provided in the above case, the power supply device according to the third modified example is still capable of conducting the above process (1) (the connection state determining process) to the above process (4) (the power control process) by determining the connection state in a device that includes functionality equivalent to the connecting unit 102, similarly to the case of determining the connection state at the connecting unit 102 in the above process (1) (the connection state determining process), for example. Consequently, the power supply device according to the third modified example of the present embodiment is able to exhibit advantages similar to those of the power supply device 100 illustrated in FIG. 6.

4. Fourth Modified Example

Furthermore, the power supply device according to the present embodiment may be additionally equipped with a notifier that issues a notification regarding the state of power transmission with respect to an external power recipient device, for example. Also, in the case of providing a notifier, the notifier may also issue various notifications, such as a notification indicating that power is not being transmitted as discussed earlier (an example of an exceptional notification), for example.

Figure 10:
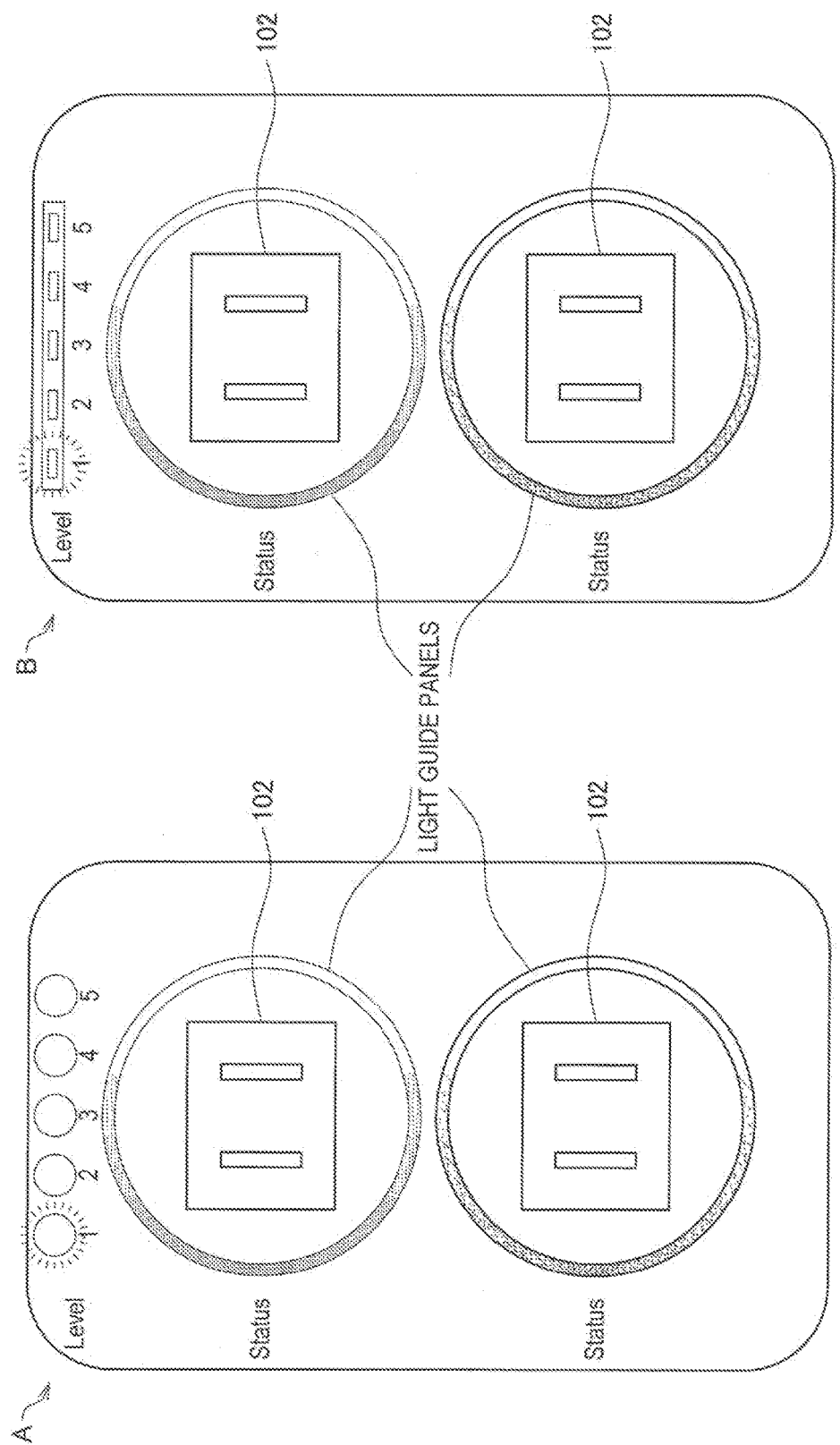
FIG. 10 is an explanatory diagram for illustrating examples of a notification regarding the state of power transmission with respect to an external power recipient device in a notifier provided in a power supply device according to the present embodiment.

FIG. 10 is an explanatory diagram for illustrating examples of a notification regarding the state of power transmission with respect to an external power recipient device of a power supply target in a notifier provided in a power supply device according to the present embodiment. FIG. 10 herein illustrates the case where the power supply device according to the present embodiment is a power outlet installed in a building, similarly to FIG. 4. The portion labeled A in FIG. 10 illustrates an example of a power outlet, while the portion labeled B in FIG. 10 illustrates another example of a power outlet.

The notifier provided in the power supply device according to the present embodiment is equipped with light emitters and a light guide panel, disposed so as to surround the connecting unit 102, that guides light produced by the light emitters and outputs the guided light from an illuminated face, for example. With the light output from the light guide panel, the notifier visually indicates the state of power transmission to an external power recipient device.

More specifically, the notifier may, for example, visually notify the user of the state of power transmission to an external power recipient device by illuminating a ring shape formed by a ring-shaped light guide panel, as illustrated by A and B in FIG. 10, for example. The illumination of the ring shape illustrated in FIG. 10 herein is set to an intensity enabling the user to recognize the illumination even in the case where an external power recipient device is connected to the connecting unit 102.

By visually indicating the state of power transmission to an external power recipient device by illuminating a ring shape as illustrated in FIG. 10, for example, the user is able to recognize the state of power transmission to an external power recipient device 360° around the connecting unit 102, such as to the left and right or above and below. In addition, the notifier provided in the power supply device according to the present embodiment may also visually notify the user of the state of power transmission to an external power recipient device according to multiple levels, as illustrated by A and B in FIG. 10, for example. However, the illumination for visually indicating the state of power transmission to an external power recipient device is not limited to a ring shape. The illumination for visually indicating the state of power transmission to an external power recipient device may also be various shapes, such as rectangular, for example.

Note that the configuration of the notifier provided in the power supply device according to the present embodiment is not limited to the above.

For example, the notifier may be additionally provided with rib members surrounding the light guide panel. A specific example of rib members provided in a notifier provided in a power supply device according to the present embodiment will be discussed later.

Also, although the above illustrates an example of the notifier visually 265 indicating the state of power transmission to an external power recipient device with light output from a light guide panel, the notification method in the notifier provided in the power supply device according to the present embodiment is not limited to the above. For example, the notifier may also issue various notifications according to a visual notification method using text, an image, or the like, or an auditory notification method using sound. The various notifications may include a notification regarding the state of power transmission with respect to an external power recipient device, or a notification indicating that power is not being transmitted (an example of an exceptional notification). Moreover, the notifier provided in the power supply device according to the present embodiment may also issue a notification regarding the state of power transmission with respect to an external power recipient device or a notification indicating that power is not being transmitted (an example of an exceptional notification) with a notification method that combines a visual notification method and an auditory notification method, for example.

The visual notification method using text, an image, or the like at this point may be realized by having a display unit (not illustrated) fulfill the role of the notifier, for example. Meanwhile, the auditory notification method using sound may be realized by a digital signal processor (DSP) and an audio output device, for example. Potential examples of an audio output device according to the present embodiment include devices such as an amplifier (amp) and one or more speakers.

In addition, the notifier provided in the power supply device according to the present embodiment may also cause an external device such as an external display device, an external audio output device, or the external power recipient device to issue a notification with a visual notification method that uses text, an image, or the like, or with an auditory notification that uses sound.

Hereinafter, the case of the notifier issuing the visual notification illustrated in FIG. 10 will be taken as an example to more specifically describe the structure of the power supply device according to the present embodiment that realizes the visual notification illustrated in FIG. 10. FIG. 11 is an explanatory diagram illustrating an exemplary structure of the power supply device according to the present embodiment that realizes the visual notification illustrated in FIG. 10. FIG. 11 herein illustrates an exemplary structure of the power supply device according to the present embodiment in the case where the power supply device according to the present embodiment is a power outlet installed in a building, similarly to FIG. 4.

The power supply device according to the present embodiment is equipped with a faceplate (labeled A in FIG. 11), decorative plates (labeled B in FIG. 11), light guide panels (labeled C in FIG. 11), a base plate (labeled D in FIG. 11), a faceplate attachment frame (labeled E in FIG. 11), an outlet member attachment frame (labeled F in FIG. 11), and outlet members (labeled G in FIG. 11), for example.

The faceplate (labeled A in FIG. 11) is a cover member for the front face of the power outlet (the face opposite the wall where the power outlet is installed). The material of the faceplate (labeled A in FIG. 11) may be transparent or non-transparent plastic, for example.

Figure 12:
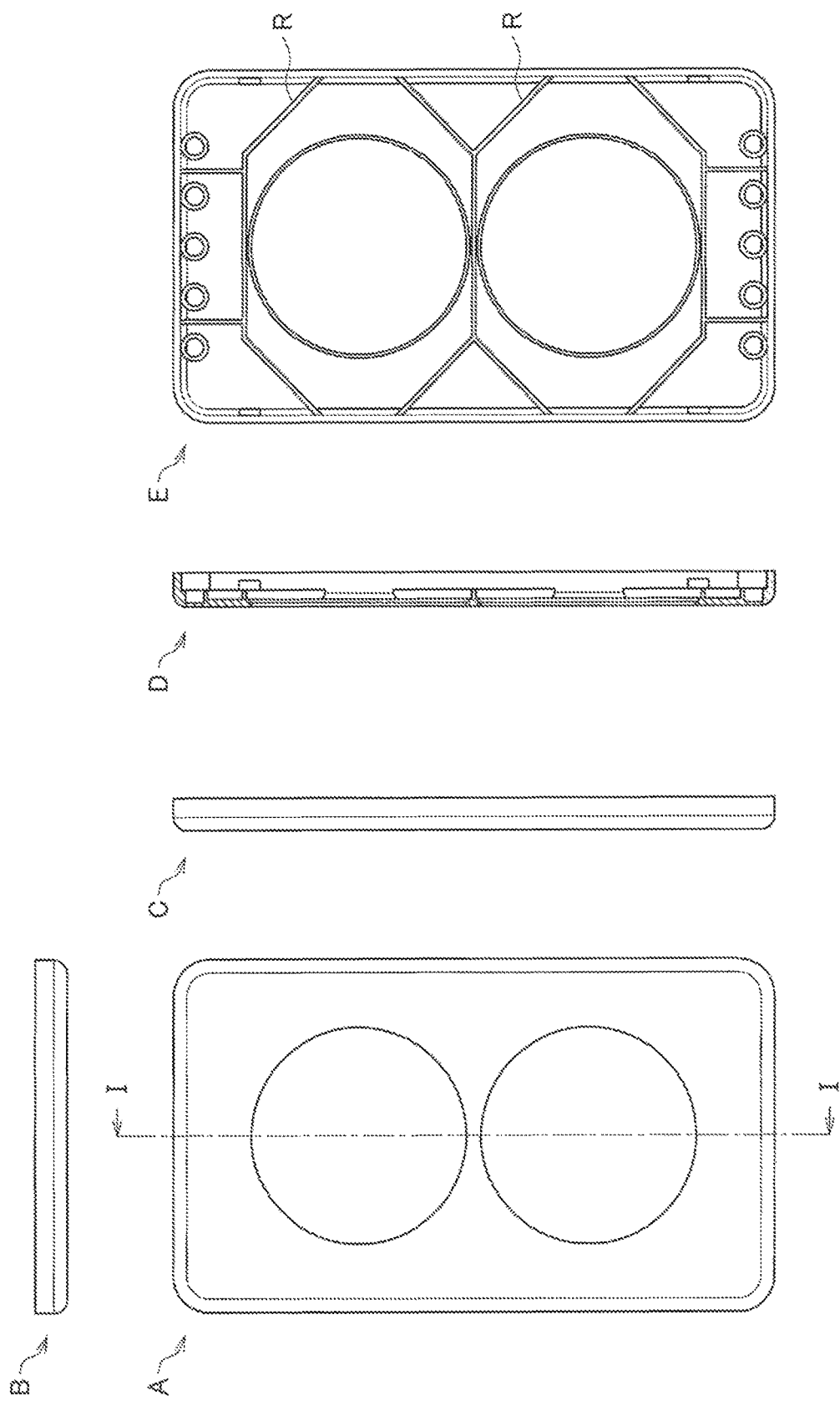
FIG. 12 is an explanatory diagram illustrating an example of a faceplate included in part of a power supply device according to the present embodiment.

FIG. 12 is an explanatory diagram illustrating an example of a faceplate included in part of the power supply device according to the present embodiment. The portion labeled A in FIG. 12 illustrates a front view of the faceplate, while the portion labeled B in FIG. 12 illustrates a plan view of the faceplate. In addition, the portion labeled C in FIG. 12 illustrates a left-side view of the faceplate, the portion labeled D in FIG. 12 illustrates a cross-section view of the faceplate taken along the line I indicated in the portion A of FIG. 12, and the portion labeled E in FIG. 12 illustrates a back view of the faceplate.

As illustrated by E in FIG. 12, rib members R surrounding the light guide panel (labeled C in FIG. 11) are provided on the faceplate, for example. The rib members R herein fulfill the role of keeping light produced by the light emitters and guided by the light guide panel inside the space partitioned by the rib members R, preventing light scattering, for example. In other words, providing the rib members R prevents light guided by the respective light guide panels from bleeding into each other.

By providing the rib members R, the power supply device according to the present embodiment is able to efficiently use light produced by the light emitters to indicate the state of power transmission to an external power recipient device. The rib members R also have the advantage of strengthening the faceplate, for example.

Returning again to FIG. 11, an exemplary structure of the power supply device according to the present embodiment that realizes the visual notification illustrated in FIG. 10 will now be described. The decorative plates (labeled B in FIG. 11) are provided in order to increase the diameter of the rings in the light guide panels (labeled C in FIG. 11).

The diameter of the rings in the light guide panels (labeled C in FIG. 11) is preferably as large as possible. This is because enlarging the plug on an external device that connects to the connecting unit 102 also enlarges the communication antenna in the wireless communication unit 204 provided in that external device.

In addition, the diameter of the rings in the light guide panels (labeled C in FIG. 11) is, for example, set to a size enabling the user to recognize the illumination even in the case where an external power recipient device is connected to the connecting unit 102, as discussed earlier. More specifically, the diameter of the rings in the light guide panels (labeled C in FIG. 11) is set to be larger than the plug of an external device that connects to the connecting unit 102, for example. This is because it may be difficult for the user to see the illumination if the diameter of the rings in the light guide panels (labeled C in FIG. 11) is smaller than the plug of an external device that connects to the connecting unit 102, for example.

Thus, for reasons such as the above, for example, a large diameter is set for the rings in the light guide panels (labeled C in FIG. 11). However, increasing the diameter of the rings in the light guide panels (labeled C in FIG. 11) creates empty space between the outlet members (labeled G in FIG. 11) and the rings in the light guide panels (labeled C in FIG. 11).

Thus, the power supply device according to the present embodiment is equipped with, for example, fitted decorative plates (labeled B in FIG. 11) to fill in the empty space between the outlet members (labeled G in FIG. 11) and the rings in the light guide panels (labeled C in FIG. 11) while setting a larger diameter for the rings in the light guide panels (labeled C in FIG. 11).

The material of the decorative plate (labeled B in FIG. 11) herein may be the same material as the faceplate (labeled A in FIG. 11), for example. By making the decorative plates (labeled B in FIG. 11) with the same material as the faceplate (labeled A in FIG. 11), it is possible to realize an outward appearance as though the rings in the light guide panels (labeled C in FIG. 11) exist inside the faceplate (labeled A in FIG. 11), for example. However, the material of the decorative plates (labeled B in FIG. 11) may obviously differ from the material of the faceplate (labeled A in FIG. 11).

The light guide panels (labeled C in FIG. 11) guide light produced by the light emitters (discussed later), and output the guided light from the illuminated face (the face opposite the wall where the power outlet is installed, for example). The light guide panels have a ring shape, as illustrated by C in FIG. 11, for example. However, as discussed earlier, the illumination for visually indicating the state of power transmission to an external power recipient device is not limited to a ring shape. In other words, the shape of a light guide panel is not limited to a ring shape as illustrated by C in FIG. 11.

The base plate (labeled D in FIG. 11) is provided with structural elements related to a power supply method according to the present embodiment, such as the wireless communication unit 104 and the control unit 106.

Figure 13:
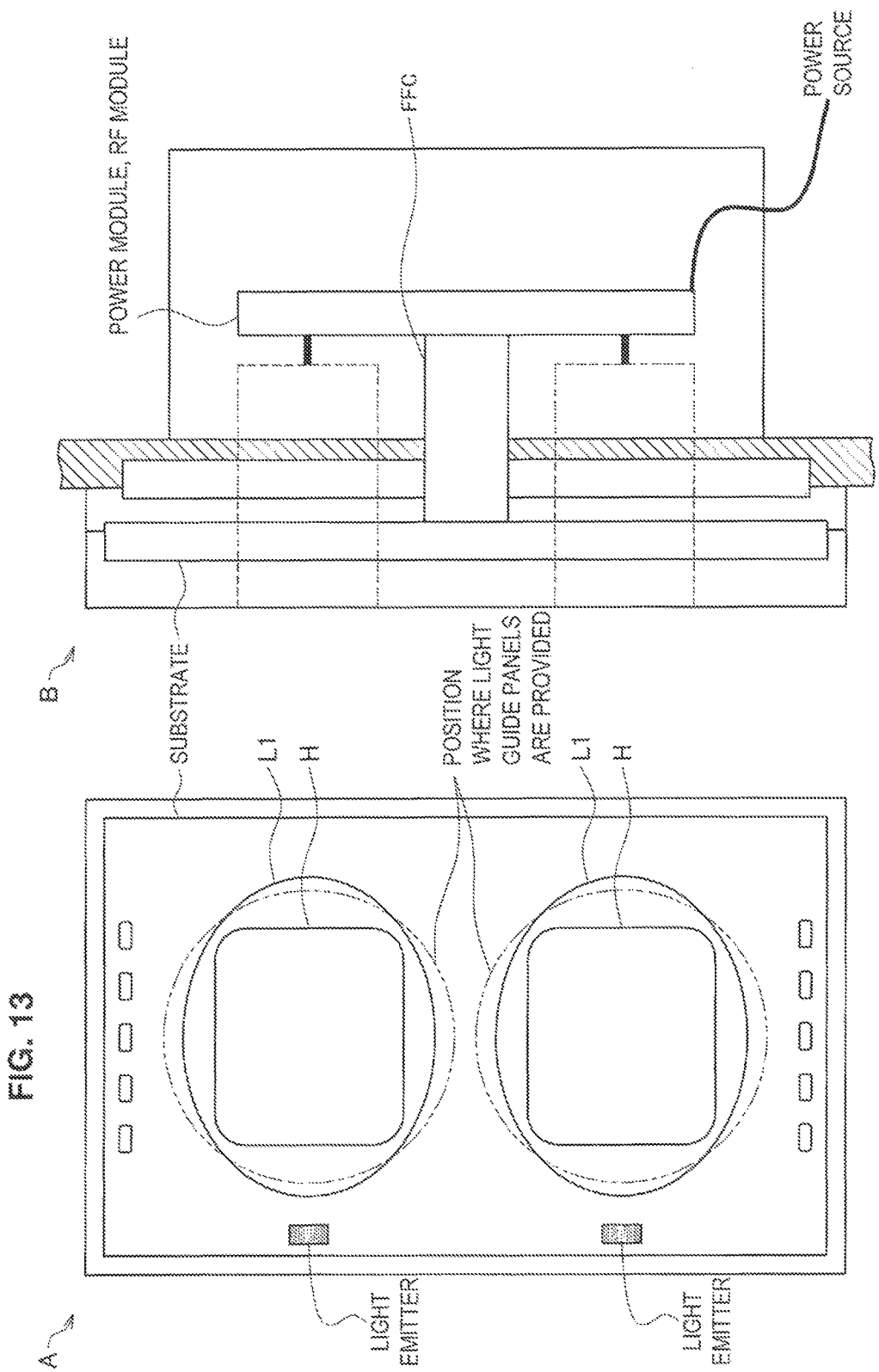
FIG. 13 is an explanatory diagram illustrating an example of a base plate included in part of a power supply device according to the present embodiment.

FIG. 13 is an explanatory diagram illustrating an example of a base plate included in part of the power supply device according to the present embodiment. The portion labeled A in FIG. 13 illustrates a front view of the base plate. In addition, the portion labeled B in FIG. 13 illustrates an example of the interior structure of the power supply device according to the present embodiment, including the base plate, that realizes the visual notification illustrated in FIG. 10. Note that the portion labeled B in FIG. 13 additionally illustrates the power module or RF module (external device) and the FFC or the like, which are provided inside the wall where the power outlet is installed.

As illustrated by A in FIG. 13, the base plate is provided with light emitters. A light emitter according to the present embodiment herein may be a light-emitting diode (LED), for example.

In addition, the light emitters according to the present embodiment are, for example, provided a distance away from the light guide panels, outward from the outer perimeter of the light guide panels (labeled as "position where light guide panels are provided" in A of FIG. 13). By providing the light emitters a distance away from the light guide panels, outward from the outer perimeter of the light guide panels as illustrated by A in FIG. 13, for example, it becomes possible to reduce unevenness in the light intensity due to the light guide panels scattering the light, thus enabling the output of better-looking light from the rings in the light guide panels. The distance between the light emitters and the light guide panels may be the maximum feasible distance, for example.

As discussed earlier, in cases such as where the power supply device according to the present embodiment is a power outlet installed in a building as illustrated in FIG. 4, restrictions may be imposed on what devices are installable due 26 to space reasons, and in addition, restrictions may be imposed on the device layout due to space reasons. In addition, since the positions of screws are determined by Japanese Industrial Standards (JIS), for example, it is difficult to dispose the light emitters above or below the base plate.

Thus, in the power supply device according to the present embodiment, the light emitters are disposed on the left portion and/or right portion of the base plate, as illustrated by A in FIG. 11, for example. Obviously, however, the positions where the light emitters are disposed in the power supply device according to the present embodiment are not limited to the positions illustrated by A in FIG. 11.

In the power supply device according to the present embodiment, the light emitters may be provided a distance away from the light guide panels, outward from the outer perimeter of the light guide panels, as illustrated by A in FIG. 13, for example.

By providing the light emitters a distance away from the light guide panels, outward from the outer perimeter of the light guide panels, it becomes possible for the light produced by the light emitters to reach farther. In other words, by providing the light emitters a distance away from the light guide panels, outward from the outer perimeter of the light guide panels, light may be output from a larger portion of the ring-shaped light guide panels, for example.

Also, by providing the light emitters a distance away from the light guide panels, outward from the outer perimeter of the light guide panels, it becomes possible to prevent unevenness due to only the light source becoming brighter, and enable the output of better-looking light from the light guide panels.

However, the method for outputting better-looking light from the light guide panels in the power supply device according to the present embodiment is not limited to the above. For example, light produced by the light emitters may also be reflected towards the illuminated face by covering colors or materials that absorb light in the base plate (labeled D in FIG. 11) with a reflective sheet or by applying a white coating. More specifically, in the power supply device according to the present embodiment, light produced by the light emitters may be reflected towards the illuminated face by printing white silk or a reflective coating onto the base plate (labeled D in FIG. 11), for example. By reflecting light produced by the light emitters towards the illuminated face, the power supply device according to the present embodiment is able to efficiently use the light produced by the light emitters.

Returning again to FIG. 11, an exemplary structure of the power supply device according to the present embodiment that realizes the visual notification illustrated in FIG. 10 will now be described. The faceplate attachment frame (labeled E in FIG. 11) is a member used to attach the faceplate (labeled A in FIG. 11).

The outlet member attachment frame (labeled F in FIG. 11) is a member used to attach the outlet member (labeled G in FIG. 11). The outlet member attachment frame (labeled F in FIG. 11) and the outlet member (labeled G in FIG. 11) herein may be typical, commercially available members, for example.

The power supply device according to the present embodiment may include the structure illustrated in FIG. 11, for example, as a structure that realizes the visual notification illustrated in FIG. 10. Obviously, however, the structure that realizes the visual notification illustrated in FIG. 10 is not limited to the structure illustrated in FIG. 11.

5. Fifth Modified Example

The power supply device according to the present embodiment is also capable of taking an arbitrary combined configuration, such as a configuration combining the configuration according to the above first modified example with the configuration according to the above second modified example, a configuration combining the configuration according to the above first modified example with the configuration according to the above third modified example, a configuration combining the configuration according to the above first modified example with the configuration according to the above fourth modified example, a configuration combining the configurations according to the first through third modified examples, and so on.

(Power Receiving Device According to the Present Embodiment)

Figure 14:
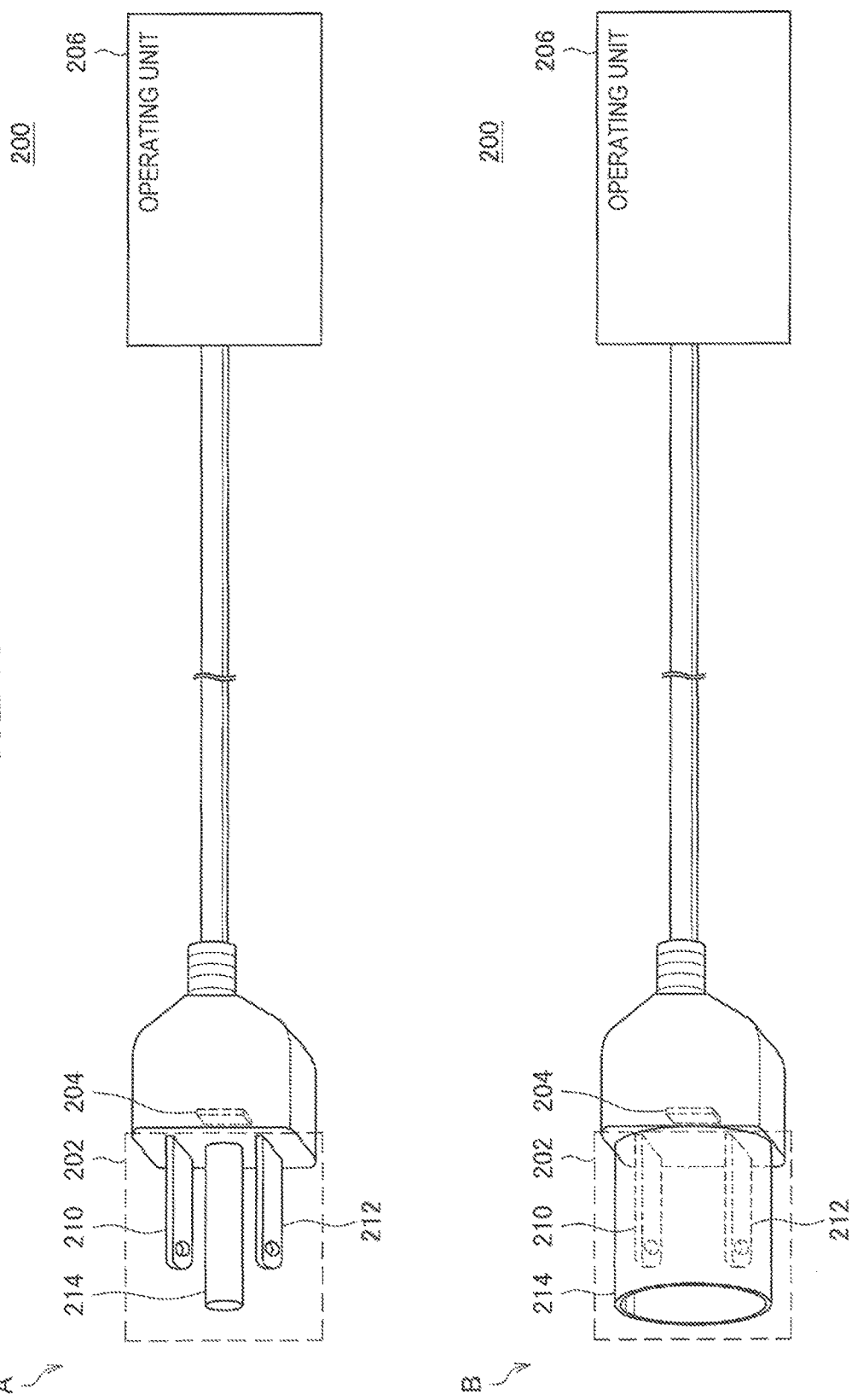
FIG. 14 is an explanatory diagram illustrating an exemplary configuration of a power receiving device according to the present embodiment.

Next, an exemplary configuration of a power receiving device according to the present embodiment will be described, being an example of an external power recipient device according to the present embodiment. FIG. 14 illustrates an exemplary configuration of a power receiving device 200 according to the present embodiment.

The power receiving device 200 is equipped with a connecting unit 202, a wireless communication unit 204, and an operating unit 206.

The connecting unit 202 connects to a power line on which electric power is transmitted.

As discussed earlier, if the power receiving device according to the present embodiment operates on DC power, there is a possibility that the power receiving device according to the present embodiment may cause damage or other problems in the case where the connecting unit 202 is connected to an existing power outlet that outputs electric power based on an electric utility.

Accordingly, the connecting unit 202 may also include a structure for restricting connection to an existing power outlet or the like. The connecting unit 202 is equipped with one or more power line connecting plugs for connecting to a power line, and one or more plugs that restrict the insertion of a power line connecting plug into an external insertion slot that accepts the insertion of a power line connecting plug (this corresponds to the insertion slots for a power line 26 connecting plug in an existing power outlet, for example).

An exemplary configuration of the power line connecting plugs and the plug that restricts the insertion of the power line connecting plug provided in the connecting unit 202 according to the present embodiment will now be described with reference to FIG. 14. Obviously, however, the configuration of the power line connecting plugs and the plug that restricts the insertion of the power line connecting plug provided in the connecting unit 202 according to the present embodiment is not limited to the configuration illustrated in FIG. 14.

Referring to the portion labeled A in FIG. 14, the connecting unit 202 is equipped with power line connecting plugs 210 and 212, and a plug 214 that restricts the insertion of the power line connecting plugs, for example. The power line connecting plugs 210 and 212 have shapes corresponding to the first insertion slots PLH1 and PLH2 of the connecting unit 102 provided in the power supply device 100 illustrated by A in FIG. 7, for example. In addition, the plug 214 that restricts the insertion of the power line connecting plugs has a shape corresponding to the second insertion slot H1 of the connecting unit 102 provided in the power supply device 100 illustrated by A in FIG. 7, for example. The plug 214 that restricts the insertion of the power line connecting plugs is also provided parallel (or approximately parallel) to the power line connecting plugs 210 and 212, for example, and the length of the plug 214 that restricts the insertion of the power line connecting plugs in the lengthwise direction is longer than the length of the power line connecting plugs 210 and 212 in the lengthwise direction. Furthermore, the plug 214 is formed with an insulating material in consideration of the possibility of a short with a power line, for example. In consideration of heat resistance as a countermeasure against heat generated on a power line, the insulating material that forms the plug 214 herein may be heat-resistant plastic, for example. Obviously, however, the material that forms the plug 214 is not limited to the example given above.

By equipping the connecting unit 202 with a structure provided with a plug 214 that restricts the insertion of the power line connecting plugs as illustrated by A in FIG. 14, for example, the connecting unit 202 is restricted from connecting to an existing power outlet. In addition, the connecting unit 202 is capable of connecting to the connecting unit 102 provided in the power supply device 100 illustrated by A in FIG. 7, for example, even in the case of equipping the connecting unit 202 with a structure provided with a plug 214 that restricts the insertion of the power line connecting plugs as illustrated by A in FIG. 14, for example.

Thus, by providing the connecting unit 202 with the structure illustrated by A in FIG. 14, for example, the power receiving device 200 is able to restrict connection to an existing power outlet that outputs electric power based on an electric utility, for example, and prevent issues such as damage to the power receiving device 200. In addition, even in the case of providing the connecting unit 202 with the structure illustrated by A in FIG. 14, for example, the power receiving device 200 is still able to receive compatible electric power from the power supply device according to the present embodiment.

Obviously, however, the configuration of the power line connecting plugs and the plug that restricts the insertion of the power line connecting plug provided in the connecting unit 202 according to the present embodiment is not limited to the configuration illustrated by A in FIG. 14. For example, the plug 214 that restricts the insertion of the power line connecting plugs provided in the connecting unit 202 may also have a shape that corresponds to the second insertion slot H2 of the connecting unit 102 provided in the power supply device 100 illustrated by B in FIG. 7, such as the plug 214 that restricts the insertion of the power line connecting plugs illustrated by B in FIG. 14. Also, the power line connecting plugs provided in the connecting unit 202 may also have shapes that correspond to the first insertion slots PLH3 and PLH4 of the connecting unit 102 provided in the power supply device 100 illustrated by C in FIG. 7, for example.

The wireless communication unit 204 wirelessly communicates with the 26 power supply device according to the present embodiment that transmits power, and transmits information related to power receiving capability. Although the wireless communication unit 204 has the configuration illustrated in FIG. 3, for example, the configuration of the wireless communication unit 204 is not limited to the configuration illustrated in FIG. 3.

The information related to power receiving capability that is transmitted by the wireless communication unit 204 herein is stored in the internal memory 270 illustrated in FIG. 3, which fulfills the role of a storage unit (not illustrated) that stores information related to power receiving capability in the power receiving device 200, for example. However, the recording medium that stores information related to power receiving capability (the recording medium that fulfills the role of the storage unit) is not limited to the internal memory 270 illustrated in FIG. 3. Also, in the case where the power receiving device 200 is not equipped with a storage unit (not illustrated), for example, the wireless communication unit 204 is also capable of transmitting information related to power receiving capability being stored in an external recording medium connected to the power receiving device 200.

The operating unit 206 operates on electric power transmitted over a power line. Potential examples of the operating unit 206 include an MPU and various devices and various processing circuits for realizing the functionality included in the power receiving device 200.

With the configuration illustrated in FIG. 14, for example, the power receiving device 200 receives electric power transmitted from the power supply device according to the present embodiment, and operates on the transmitted electric power. Obviously, however, the configuration of the power receiving device 200 according to the present embodiment is not limited to the configuration illustrated in FIG. 14.

(Adapter According to the Present Embodiment)

The external power recipient device according to the present embodiment is not limited to a power receiving device according to the present embodiment as illustrated by example in FIG. 14. For example, a power receiving device such as the power receiving device according to the present embodiment is also capable of receiving electric power transmitted from the power supply device according to the present embodiment via an adapter, which is an intermediate device used when connecting multiple different devices. Thus, an exemplary configuration of an adapter according to the present embodiment will now be described, being another example of an external power recipient device according to the present embodiment.

Figure 15:
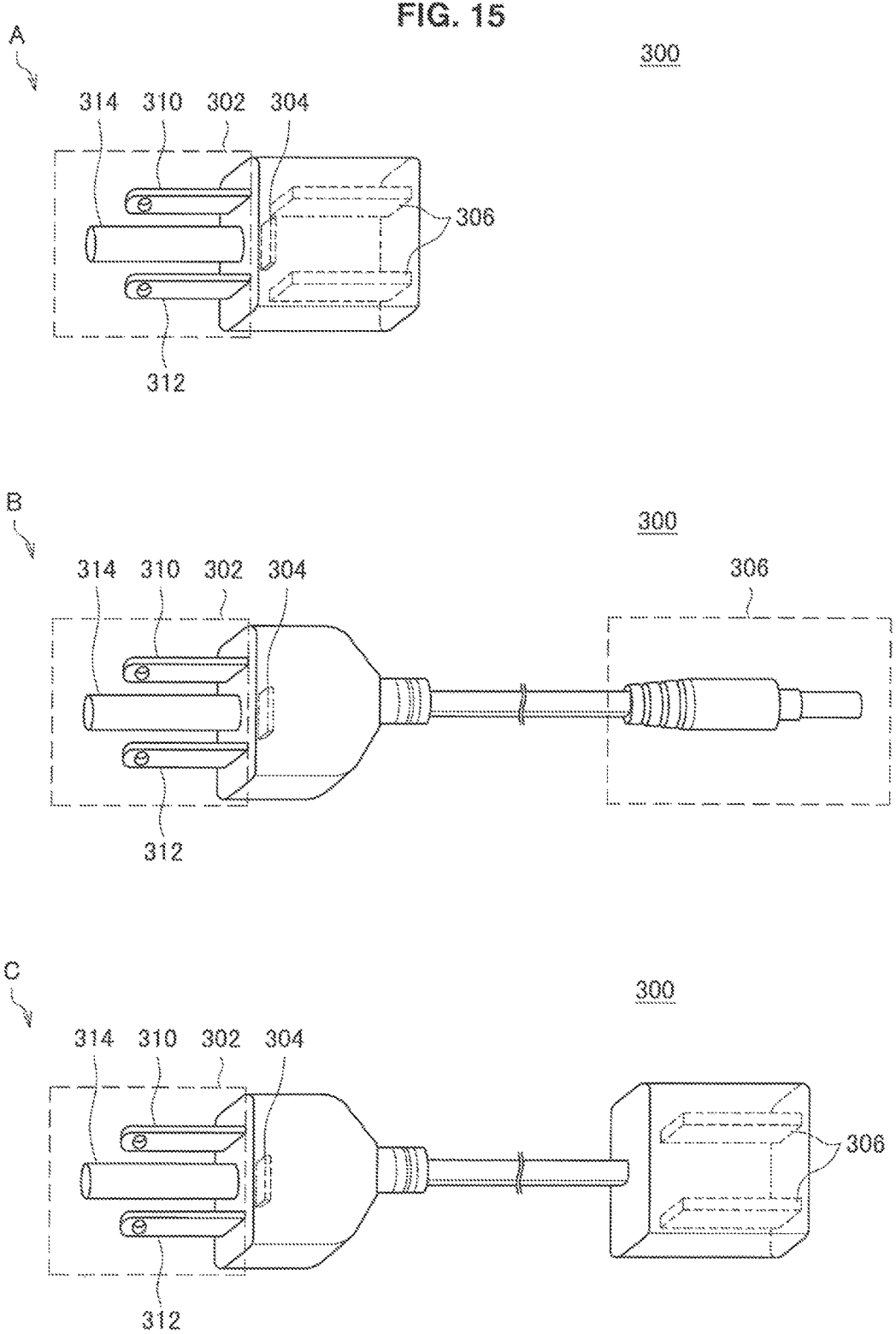
FIG. 15 is an explanatory diagram illustrating exemplary configurations of an adapter according to the present embodiment.

FIG. 15 is an explanatory diagram illustrating exemplary configurations of an adapter 300 according to the present embodiment. The adapter 300 is equipped with a connecting unit 302, a wireless communication unit 304, and an output unit 306, for example.

The connecting unit 302 connects to a power line on which electric power is transmitted. The connecting unit 302 herein takes a configuration similar to that of the connecting unit provided in the power receiving device according to the present embodiment discussed earlier, for example.

FIG. 15 herein illustrates an example in which the connecting unit 302 has a similar configuration as the connecting unit 202 provided in the power receiving device 200 illustrated by A in FIG. 14. By providing the connecting unit 302 with the structure illustrated by in FIG. 15, for example, the adapter 300 is able to restrict connection to an existing power outlet that outputs electric power based on an electric utility, for example, and prevent issues such as damage to a power receiving device that receives electric power output from the output unit 306. In addition, even in the case of providing the connecting unit 302 with the structure illustrated in FIG. 15, for example, the adapter 300 is still able to receive compatible electric power from the power supply device according to the present embodiment. Obviously, however, the configuration of the connecting unit provided in the adapter according to the present embodiment is not limited to the configuration illustrated in FIG. 15.

The wireless communication unit 304 wirelessly communicates with the power supply device according to the present embodiment that transmits power, and transmits information related to power receiving capability. The wireless communication unit 304 takes a configuration similar to that of the wireless communication unit provided in the power receiving device according to the present embodiment discussed earlier, for example.

The information related to power receiving capability that is transmitted by the wireless communication unit 304 herein is stored in the internal memory 270 illustrated in FIG. 3, which fulfills the role of a storage unit (not illustrated) that stores information related to power receiving capability in the adapter 300, for example. However, the recording medium that stores information related to power receiving capability is not limited to the internal memory 270 illustrated in FIG. 3. Also, in the case where the adapter 300 is not equipped with a storage unit (not illustrated), for example, the wireless communication unit 304 is also capable of transmitting information related to power receiving capability being stored in an external recording medium connected to the adapter 300.

The output unit 306 outputs the electric power transmitted over a power line, or in other words, the electric power received via the connecting unit 302.

The output unit 306 herein may be an insertion slot that accepts the insertion of a power line connecting plug that connects to a power line (this corresponds to the first insertion slots provided in the power supply device 100 illustrated by A in FIG. 7), as illustrated by A and C in FIG. 15, for example. In addition, there may be one insertion slot that accepts the insertion of a power line connecting plug that connects to a power line, as in the first insertion slot provided in the power supply device 100 illustrated by C in FIG. 7, or there may be three or more insertion slots. However, the output unit 306 provided in the adapter 300 according to the present embodiment is not limited to insertion slots that accept the insertion of a power line connecting plug that connects to a power line as illustrated by A and C in FIG. 15. For example, the output unit 306 may also be a jack (an AC jack or DC jack) as illustrated by B in FIG. 15, or a USB connector.

With the configurations illustrated in FIG. 15, for example, the adapter 300 receives electric power transmitted from the power supply device according to the present embodiment, and outputs the received electric power. Obviously, however, the configuration of the adapter 300 according to the present embodiment is not limited to the configurations illustrated in FIG. 15.

Hereinbefore, a power supply device has been described as the present embodiment, but the present embodiment is not limited to this example. For example, the present embodiment can be applied to various machines or facilities such as electrical outlets installed in buildings or the like, devices that supply power to computers such as personal computers (PCs) or servers, multi-plugs, electric vehicles, power-driven devices, or the like, display devices, or the like. In addition, for example, the present embodiment can be applied to vehicles such as electric vehicles or hybrid cars that undertake the function of the power supply device. Moreover, the power supply device according to the present embodiment may receive power transmitted from an external device. In other words, the power supply device according to the present embodiment may undertake the function of the power receiving device.

Also, with the power supply device according to the present embodiment, it is possible to realize a power system capable of causing an external power recipient device to receive electric power compatible with the external power recipient device in a home or building, for example. FIG. 16 is an explanatory diagram illustrating an example of a power system having the power supply device according to the present embodiment. FIG. 16 illustrates a power system that includes power supply devices 100A, 100B, 100C, and so on, power receiving devices 200 and so on, an electric switchboard 400, and a gateway server 500. In the case of using the power system illustrated in FIG. 16, the user of a power receiving device 200 (external power recipient device) is able to connect the power receiving device 200 to the power supply devices 100A, 100B, 100C and so on in the power system, for example, and thereby cause the power receiving device 200 to receive electric power which is compatible with the power receiving device 200 and which does not exceed the power receiving capability of the power receiving device 200. Thus, by using the power system illustrated in FIG. 16, for example, convenience is potentially improved for the user of a power receiving device 200 and so on (an external power recipient device). Obviously, however, the configuration of a power system including the power supply device according to the present embodiment is not limited to the configuration illustrated in FIG. 16.

Further, although a power receiving device has been described as the present embodiment, the present embodiment is not limited to this example. For example, the present embodiment can be applied to various devices driven by electric power, including communication devices such as PCs and other computers, mobile phones, or smart phones, video/audio reproducing devices (or video/audio recording/reproducing devices), portable game machines, display devices, television receivers, lighting devices, toasters, and vehicles driven by electric power such as electric vehicles or hybrid cars. For example, the present embodiment can be applied to a plug (device having a plug member). In addition, the power receiving device according to the present embodiment may transmit electric power to an external device. In other words, the power receiving device according to the present embodiment may undertake the function of the power supply device.

(Program According to Present Embodiment)

A program (for example, a program capable of executing the process related to the power supply method according to the present embodiment such as the process from (1) (the connection state determining process) to (4) (the power control process)) causing a computer to function as the power supply device according to the present embodiment is executed in a computer to cause an external power recipient device to receive power compatible with the external power recipient device.

It should be understood by those skilled in the art that various modifications, combinations, sub-combinations and alterations may occur depending on design requirements and other factors insofar as they are within the scope of the appended claims or the equivalents thereof.

For example, it has been described above that a program (computer program) causing a computer to function as the power supply device according to the present embodiment is provided. However, in the present embodiment, a recording medium recording each program described above or a recording medium recording both programs can be provided as well.

The above-described configuration illustrates an example of the present embodiment, and it should be understood that the above-described configuration belongs to the technical scope of the present disclosure.

Additionally, the present technology may also be configured as below.

(1) A power supply device, including:
a connection state determiner that determines a connection state between an external power recipient device and a power line on which electric power is transmitted;
a communication control unit that, in a case where the connection state determiner determines that the external power recipient device is connected to the power line, causes information related to power receiving capability corresponding to the external power recipient device to be acquired by wireless communication;
a power receiving capability specifier that specifies the power receiving capability of the external power recipient device on the basis of the acquired information related to the power receiving capability; and
a power control unit that causes electric power compatible with the external power recipient device to be transmitted on the basis of the specified power receiving capability.

(2) The power supply device according to (1), further including:
a wireless communication unit that wirelessly communicates with an external device,
wherein the power receiving capability specifier specifies the power receiving capability of the external power recipient device on the basis of the information related to the power receiving capability acquired from the external power recipient device due to the wireless communication unit wirelessly communicating with the external power recipient device.

(3) The power supply device according to (2),
wherein the wireless communication unit acquires the information related to the power receiving capability transmitted by load modulation conducted at the external power recipient device.

(4) The power supply device according to (3),
wherein the wireless communication unit includes a communication antenna that transmits a carrier wave according to a high-frequency signal having a higher frequency than a frequency of the electric power, and a communication processor that transmits the high-frequency signal via the communication antenna and communicates with the external power recipient device.

(5) The power supply device according to (4), further including:
a connecting unit that connects the power line to an external device,
wherein the communication antenna is disposed in a manner that the communication antenna surrounds the connecting unit.

(6) The power supply device according to (5),
wherein a center position of the communication antenna is horizontally and/or vertically offset from a center position in the connecting unit.

(7) The power supply device according to any one of (1) to (6),
wherein the power receiving capability specifier specifies the power receiving capability of the external power recipient device on the basis of power receiving capability information indicating the power receiving capability of the external power recipient device, the power receiving capability information being the acquired information related to the power receiving capability.

(8) The power supply device according to any one of (1) to (6),
wherein the power receiving capability specifier specifies the external power recipient device on the basis of identification information indicating the external power recipient device, the identification information being the acquired information related to the power receiving capability, and specifies the power receiving capability corresponding to the specified external power recipient device.

(9) The power supply device according to any one of (1) to (8),
wherein the power control unit determines whether electric power supplied from a power source exceeds the specified power receiving capability, and
wherein, in a case where a determination result indicates that the power receiving capability is exceeded, the power control unit converts the electric power supplied from the power source into electric power that does not exceed the specified power receiving capability and causes the converted electric power to be transmitted, and, in a case where the determination result does not indicate that the power receiving capability is exceeded, the power control unit causes the electric power supplied from the power source to be transmitted.

(10) The power supply device according to any one of (1) to (9), further including:

a connecting unit that connects the power line to an external device, wherein the connection state determiner determines a connection state between the power line and the external device at the connecting unit.

(11) The power supply device according to (10), wherein the connecting unit includes one or a plurality of first insertion slots that accept insertion of a power line connecting plug used for connecting to a power line, and one or a plurality of second insertion slots that accept insertion of a plug having a different shape from a shape of the power line connecting plug.

(12) The power supply device according to any one of (1) to (11), further including:

a notifier that issues a notification regarding a state of power transmission with respect to the external power recipient device.

(13) The power supply device according to (12), further including:

a connecting unit that connects the power line to an external device, wherein the notifier includes a light emitter, and a light guide panel, disposed in a manner that the light guide panel surrounds the connecting unit, that guides light produced by the light emitter and outputs the guided light from an illuminated face, and wherein the notifier visually indicates the state of power transmission with respect to the external power recipient device with the light output from the light guide panel.

(14) The power supply device according to (13), wherein the light emitter is provided a distance away from the light guide panel, outward from an outer perimeter of the light guide panel.

(15) The power supply device according to (13) or (14), wherein the notifier further includes a rib member surrounding the light guide panel.

(16) An adapter, including:

a connecting unit that connects to a power line on which electric power is transmitted;

an output unit that outputs the electric power transmitted from the power line; and a wireless communication unit that wirelessly communicates with a power supply device that transmits electric power, and transmits information related to power receiving capability.

(17) The adapter according to (16), wherein the connecting unit includes one or a plurality of power line connecting plugs used for connecting to the power line, and one or a plurality of plugs that restrict insertion of the power line connecting plugs into an external insertion slot that accept insertion of the power line connecting plugs.

(18) The adapter according to (16) or (17), further including:

a storage unit that stores the information related to the power receiving capability, wherein the wireless communication unit transmits the information related to the power receiving capability being stored in the storage unit.

(19) A power receiving device, including:

a connecting unit that connects to a power line on which electric power is transmitted;

a storage unit that stores information related to power receiving capability;

a wireless communication unit that wirelessly communicates with a power supply device that transmits electric power, and transmits the information related to the power receiving capability; and an operating unit that operates on the electric power transmitted from the power line.

(20) A power supply method, including:

determining a connection state between an external power recipient device and a power line on which electric power is transmitted;

causing, in a case of determining that the external power recipient device is connected to the power line, information related to power receiving capability corresponding to the external power recipient device to be acquired by wireless communication;

specifying the power receiving capability of the external power recipient device on the basis of the acquired information related to the power receiving capability; and causing electric power compatible with the external power recipient device to be transmitted on the basis of the specified power receiving capability.

The present disclosure contains subject matter related to those disclosed in Japanese Priority Patent Application JP 2012-118107 filed in the Japan Patent Office on May 24, 2012, and Japanese Priority Patent Application JP 2012-177234 filed in the Japan Patent Office on Aug. 9, 2012, the entire contents of which are hereby incorporated by reference.

What is claimed is:

1. A power supply device, comprising:
a connecting unit that transmits electric power to an external power recipient device via a power line;
a connection state determiner that determines that the external power recipient device is physically connected to the connecting unit via the power line;
a wireless communication unit including a communication antenna and a communication processor that wirelessly communicates with the external power recipient device, wherein the communication processor transmits a carrier wave according to a high-frequency signal via the communication antenna, and wherein the high-frequency signal has a higher frequency than a frequency of the electric power;
a communication control unit that, in a case where the connection state determiner determines that the external power recipient device is physically connected to the connecting unit via the power line, is configured to initiate control of the wireless communication unit to transmit the carrier wave to acquire from the external power recipient device information related to power receiving capability corresponding to the external power recipient device via the communication antenna of the wireless communication unit, and in a case where the connection state determiner determines that the external power recipient device is not physically connected to the connecting unit via the power line, the communication control unit is configured to initiate control of the wireless communication unit to stop transmission of the carrier wave;
a power receiving capability specifier that specifies the power receiving capability of the external power recipient device on the basis of the acquired information related to the power receiving capability; and
a power control unit that is configured to transmit electric power compatible with the external power recipient device on the basis of the specified power receiving capability.

2. The power supply device according to claim 1,
wherein the communication control unit is configured to acquire the information related to the power receiving capability via the communication antenna by load modulation conducted at the external power recipient device.

3. The power supply device according to claim 1, wherein the communication antenna is disposed in a manner that the communication antenna surrounds the connecting unit.

4. The power supply device according to claim 3, wherein a center position of the communication antenna is one or more of horizontally and vertically offset from a center position in the connecting unit.

5. The power supply device according to claim 1, wherein the power receiving capability specifier specifies the external power recipient device on the basis of identification information indicating the external power recipient device, the identification information being the acquired information related to the power receiving capability, and specifies the power receiving capability corresponding to the specified external power recipient device.

6. The power supply device according to claim 1, wherein the power control unit determines whether electric power supplied from a power source exceeds the specified power receiving capability, and
wherein, in a case where a determination result indicates that the power receiving capability is exceeded, the power control unit converts the electric power supplied from the power source into electric power that does not exceed the specified power receiving capability and transmits the converted electric power, and, in a case where the determination result does not indicate that the power receiving capability is exceeded, the power control unit transmits the electric power supplied from the power source.

7. The power supply device according to claim 1, wherein the connecting unit includes one or a plurality of first insertion slots that accept insertion of a power line connecting plug used for connecting to a power line, and one or a plurality of second insertion slots that accept insertion of a plug having a different shape from a shape of the power line connecting plug.

8. The power supply device according to claim 1, further comprising:
a notifier that issues a notification regarding a state of power transmission with respect to the external power recipient device.

9. The power supply device according to claim 8, wherein the notifier includes a light emitter, and a light guide panel, disposed in a manner that the light guide panel surrounds the connecting unit, that guides light produced by the light emitter and outputs the guided light from an illuminated face, and
wherein the notifier visually indicates the state of power transmission with respect to the external power recipient device with the light output from the light guide panel.

10. The power supply device according to claim 9, wherein the light emitter is provided a distance away from the light guide panel, outward from an outer perimeter of the light guide panel.

11. The power supply device according to claim 9, wherein the notifier further includes a rib member surrounding the light guide panel.

12. A power receiving device, comprising:
a connecting unit that receives electric power from a power supply device via a power line;
a storage unit that stores information related to power receiving capability;
a wireless communication unit that wirelessly communicates via a communication antenna with the power supply device that transmits the electric power, and transmits the information related to the power receiving capability via the communication antenna when it is determined that the connecting unit is physically connected to the power line, and when it is determined that the connecting unit is not physically connected to the power line, the wireless communication unit is controlled to stop transmission of the information related to the power receiving capability; and
an operating unit that operates on the electric power transmitted from the power line according to the transmitted information related to the power receiving capability.

13. A power supply method, comprising:
determining that an external power recipient device is physically connected to a connecting unit via a power line;
acquiring from the external power recipient device, in a case of determining that the external power recipient device is physically connected to the connecting unit via the power line, information related to power receiving capability corresponding to the external power recipient device by initiating control of a wireless communication unit to transmit a carrier wave according to a high-frequency signal via a communication antenna of the wireless communication unit, and in a case of determining that the external power recipient device is not physically connected to the connecting unit via the power line, initiating control of the wireless communication unit to stop transmission of the carrier wave;
specifying the power receiving capability of the external power recipient device on the basis of the acquired information related to the power receiving capability; and
transmitting electric power compatible with the external power recipient device on the basis of the specified power receiving capability.

* * * * *